United States Patent
Davis et al.

(10) Patent No.: US 12,189,347 B2
(45) Date of Patent: Jan. 7, 2025

(54) ROTATION SENSOR FOR A CROWN OF AN ELECTRONIC WATCH

(71) Applicant: Apple Inc., Cupertino, CA (US)

(72) Inventors: Richard A. Davis, San Carlos, CA (US); Cole J. Bowden, San Jose, CA (US); Craig A. Horton, Hillsborough, CA (US); Ming Kun Shi, Morgan Hill, CA (US)

(73) Assignee: Apple Inc., Cupertino, CA (US)

( * ) Notice: Subject to any disclaimer, the term of this patent is extended or adjusted under 35 U.S.C. 154(b) by 386 days.

(21) Appl. No.: 17/840,222

(22) Filed: Jun. 14, 2022

(65) Prior Publication Data

US 2023/0400818 A1    Dec. 14, 2023

(51) Int. Cl.
*G04G 21/08* (2010.01)
*G01D 5/26* (2006.01)
*G01D 5/347* (2006.01)

(52) U.S. Cl.
CPC ............ *G04G 21/08* (2013.01); *G01D 5/266* (2013.01); *G01D 5/3473* (2013.01)

(58) Field of Classification Search
CPC ........ G04G 21/08; G04G 9/007; G04G 17/08; G04G 21/025; G01D 5/266; G01D 5/3473; G01D 5/34; G01D 5/30; G04C 3/002; G06F 3/0425; G04B 37/10; G04B 27/002; H01H 3/122; H01H 9/16; H01H 25/008; H01H 2215/006; H01H 2221/01; H01H 25/06; H01H 2209/006; H01H 2223/002
See application file for complete search history.

(56) References Cited

U.S. PATENT DOCUMENTS

| | | |
|---|---|---|
| 2,237,860 A | 4/1941 | Bolle |
| 2,288,215 A | 6/1942 | Taubert et al. |
| 2,497,935 A | 2/1950 | Feurer |
| 2,771,734 A | 11/1956 | Morf |
| 2,788,236 A | 4/1957 | Kafowi |
| 2,797,592 A | 7/1957 | Marrapese |

(Continued)

FOREIGN PATENT DOCUMENTS

| | | |
|---|---|---|
| AU | 2007313960 | 5/2008 |
| CH | 1888928 | 1/1937 |

(Continued)

OTHER PUBLICATIONS

Author Unknown, "Desirable Android Wear smartwatch from LG," Gulf News, Dubai, 3 pages, Jan. 30, 2015.

(Continued)

*Primary Examiner* — Edwin A. Leon
(74) *Attorney, Agent, or Firm* — Brownstein Hyatt Farber Schreck, LLP

(57) ABSTRACT

An electronic watch may include a housing and a crown configured to receive a rotational input. The crown may include a knob external to the housing, a rotor coupled to the knob and configured to rotate in response to the rotational input, the rotor defining a recess extending about a circumference of the rotor, and a coating positioned in the recess and configured to reflect at least a portion of light incident on the coating. The electronic watch may further include an optical sensing system configured to detect the rotational input using the reflected portion of the light.

20 Claims, 13 Drawing Sheets

(56) References Cited

U.S. PATENT DOCUMENTS

| | | |
|---|---|---|
| 3,040,514 A | 6/1962 | Dinstman |
| 3,056,030 A | 9/1962 | Kelchner |
| 3,130,539 A | 4/1964 | Davis |
| 3,355,873 A | 12/1967 | Morf |
| 3,362,154 A | 1/1968 | Perret |
| 3,410,247 A | 11/1968 | Dronberger |
| 3,495,398 A | 2/1970 | Widmer et al. |
| 3,577,876 A | 5/1971 | Spadini |
| 3,621,649 A | 11/1971 | Vulcan et al. |
| 3,662,618 A | 5/1972 | Kroll et al. |
| 3,733,803 A | 5/1973 | Hiraga |
| 3,937,002 A | 2/1976 | Van Haften |
| 4,007,347 A | 2/1977 | Haber |
| 4,031,341 A | 6/1977 | Wuthrich et al. |
| 4,037,068 A | 7/1977 | Gaynor |
| 4,051,665 A | 10/1977 | Arn |
| 4,077,200 A | 3/1978 | Schneider |
| 4,133,404 A | 1/1979 | Griffin |
| 4,170,104 A | 10/1979 | Yamagata |
| 4,203,280 A | 5/1980 | Ziegler |
| 4,258,096 A | 3/1981 | LaMarche |
| 4,274,152 A | 6/1981 | Ikegami |
| 4,287,400 A | 9/1981 | Kitik |
| 4,289,400 A | 9/1981 | Kubola et al. |
| 4,311,026 A | 1/1982 | Ochoa |
| 4,311,990 A | 1/1982 | Burke |
| 4,324,956 A | 4/1982 | Sakakino et al. |
| 4,345,119 A | 8/1982 | Latasiewicz |
| 4,364,674 A | 12/1982 | Tesch |
| 4,379,642 A | 4/1983 | Meyrat |
| 4,395,134 A | 7/1983 | Luce |
| 4,396,298 A | 8/1983 | Ripley |
| 4,417,824 A | 11/1983 | Paterson et al. |
| 4,448,199 A | 5/1984 | Schmid |
| 4,520,306 A | 5/1985 | Kirby |
| 4,581,509 A | 4/1986 | Sanford et al. |
| 4,600,316 A | 7/1986 | Besson |
| 4,617,461 A | 10/1986 | Subbarao et al. |
| 4,634,861 A | 1/1987 | Ching et al. |
| 4,641,026 A | 2/1987 | Garcia, Jr. |
| 4,670,737 A | 6/1987 | Rilling |
| 4,766,642 A | 8/1988 | Gaffney et al. |
| 4,783,772 A | 11/1988 | Umemoto et al. |
| 4,884,073 A | 11/1989 | Souloumiac |
| 4,914,831 A | 4/1990 | Kanezashi et al. |
| 4,922,070 A | 5/1990 | Dorkinski |
| 4,931,794 A | 6/1990 | Haag |
| 4,952,799 A | 8/1990 | Loewen |
| 4,980,685 A | 12/1990 | Souloumiac et al. |
| 4,987,299 A | 1/1991 | Kobayashi et al. |
| 5,001,687 A | 3/1991 | Brien |
| 5,034,602 A | 7/1991 | Garcia et al. |
| 5,177,355 A | 1/1993 | Branan |
| 5,214,278 A | 5/1993 | Banda |
| 5,258,592 A | 11/1993 | Nishikawa et al. |
| 5,288,993 A | 2/1994 | Bidiville et al. |
| 5,347,123 A | 9/1994 | Jackson et al. |
| 5,383,166 A | 1/1995 | Gallay |
| 5,471,054 A | 11/1995 | Watanabe |
| 5,477,508 A | 12/1995 | Will |
| 5,509,174 A | 4/1996 | Worrell |
| 5,559,761 A | 9/1996 | Frenkel et al. |
| 5,572,314 A | 11/1996 | Hyman et al. |
| 5,583,560 A | 12/1996 | Florin et al. |
| 5,631,881 A | 5/1997 | Pessey et al. |
| 5,726,645 A | 3/1998 | Kamon et al. |
| 5,738,104 A | 4/1998 | Lo |
| 5,748,111 A | 5/1998 | Bates |
| 5,825,353 A | 10/1998 | Will |
| 5,841,050 A | 11/1998 | Clift et al. |
| 5,847,335 A | 12/1998 | Sugahara et al. |
| 5,867,082 A | 2/1999 | Van Zeeland |
| 5,943,233 A | 8/1999 | Ebina |
| 5,953,001 A | 9/1999 | Challener et al. |
| 5,960,366 A | 9/1999 | Duwaer et al. |
| 5,963,332 A | 10/1999 | Feldman et al. |
| 5,999,168 A | 12/1999 | Rosenberg et al. |
| 6,069,567 A | 5/2000 | Zawilski |
| 6,128,006 A | 10/2000 | Rosenberg et al. |
| 6,134,189 A | 10/2000 | Carrard |
| 6,154,201 A | 11/2000 | Levin et al. |
| 6,175,679 B1 | 1/2001 | Veligdan et al. |
| 6,203,190 B1 | 3/2001 | Stotz |
| 6,241,684 B1 | 6/2001 | Amano |
| 6,246,050 B1 | 6/2001 | Tullis et al. |
| 6,252,825 B1 | 6/2001 | Perotto |
| 6,304,247 B1 | 10/2001 | Black |
| 6,355,891 B1 | 3/2002 | Ikunami |
| 6,361,502 B1 | 3/2002 | Puolakanaho et al. |
| 6,377,239 B1 | 4/2002 | Isikawa |
| 6,392,640 B1 | 5/2002 | Will |
| 6,396,006 B1 | 5/2002 | Yokoji et al. |
| 6,422,740 B1 | 7/2002 | Leuenberger |
| 6,477,117 B1 | 11/2002 | Narayanaswami et al. |
| 6,502,982 B1 | 1/2003 | Bach et al. |
| 6,525,278 B2 | 2/2003 | Villain et al. |
| 6,556,222 B1 | 4/2003 | Narayanaswami |
| 6,575,618 B1 | 6/2003 | Inoue et al. |
| 6,587,400 B1 | 7/2003 | Line |
| 6,636,197 B1 | 10/2003 | Goldenberg et al. |
| 6,646,635 B2 | 11/2003 | Pogatetz et al. |
| 6,661,438 B1 | 11/2003 | Shiraishi et al. |
| 6,672,758 B2 | 1/2004 | Ehrsam et al. |
| 6,794,992 B1 | 9/2004 | Rogers |
| 6,809,275 B1 | 10/2004 | Cheng et al. |
| 6,834,430 B2 | 12/2004 | Worrell |
| 6,846,998 B2 | 1/2005 | Hasumi et al. |
| 6,882,596 B2 | 4/2005 | Guanter |
| 6,888,076 B2 | 5/2005 | Hetherington |
| 6,896,403 B1 | 5/2005 | Gau |
| 6,909,378 B1 | 6/2005 | Lambrechts et al. |
| 6,914,551 B2 | 7/2005 | Vidal |
| 6,950,695 B2 | 9/2005 | Chen |
| 6,961,099 B2 | 11/2005 | Takano et al. |
| 6,963,039 B1 | 11/2005 | Weng et al. |
| 6,967,903 B2 | 11/2005 | Guanter |
| 6,977,868 B2 | 12/2005 | Brewer et al. |
| 6,982,930 B1 | 1/2006 | Hung |
| 6,985,107 B2 | 1/2006 | Anson |
| 6,987,568 B2 | 1/2006 | Dana |
| 6,998,553 B2 | 2/2006 | Hisamune et al. |
| 7,009,915 B2 | 3/2006 | Brewer et al. |
| 7,016,263 B2 | 3/2006 | Gueissaz et al. |
| 7,021,442 B2 | 4/2006 | Borgerson |
| 7,031,228 B2 | 4/2006 | Born et al. |
| 7,034,237 B2 | 4/2006 | Ferri et al. |
| 7,081,905 B1 | 7/2006 | Raghunath et al. |
| 7,102,626 B2 | 9/2006 | Denny, III |
| 7,106,307 B2 | 9/2006 | Cok |
| 7,111,365 B1 | 9/2006 | Howie, Jr. |
| 7,113,450 B2 | 9/2006 | Plancon et al. |
| 7,119,289 B2 | 10/2006 | Lacroix |
| 7,135,673 B2 | 11/2006 | Saint Clair |
| 7,167,083 B2 | 1/2007 | Giles |
| 7,187,359 B2 | 3/2007 | Numata |
| 7,244,927 B2 | 7/2007 | Huynh |
| 7,255,473 B2 | 8/2007 | Hiranuma et al. |
| 7,265,336 B2 | 9/2007 | Hataguchi et al. |
| 7,274,303 B2 | 9/2007 | Dresti et al. |
| 7,285,738 B2 | 10/2007 | Lavigne et al. |
| 7,286,063 B2 | 10/2007 | Gauthey |
| 7,292,741 B2 | 11/2007 | Ishiyama et al. |
| 7,358,481 B2 | 4/2008 | Yeoh et al. |
| 7,369,308 B2 | 5/2008 | Tsuruta et al. |
| 7,371,745 B2 | 5/2008 | Ebright et al. |
| 7,385,874 B2 | 6/2008 | Vuilleumier |
| 7,404,667 B2 | 7/2008 | Born et al. |
| 7,465,917 B2 | 12/2008 | Chin et al. |
| 7,468,036 B1 | 12/2008 | Rulkov et al. |
| 7,474,592 B2 | 1/2009 | Lyon |
| 7,506,269 B2 | 3/2009 | Lang et al. |
| 7,520,664 B2 | 4/2009 | Wai |
| 7,528,824 B2 | 5/2009 | Kong |
| 7,545,367 B2 | 6/2009 | Sunda et al. |

(56) References Cited

U.S. PATENT DOCUMENTS

| | | |
|---|---|---|
| 7,557,795 B2 | 7/2009 | Kong et al. |
| 7,591,582 B2 | 9/2009 | Hiranuma et al. |
| 7,593,755 B2 | 9/2009 | Colando et al. |
| 7,605,846 B2 | 10/2009 | Watanabe |
| 7,634,263 B2 | 12/2009 | Louch et al. |
| 7,646,677 B2 | 1/2010 | Nakamura |
| 7,655,874 B2 | 2/2010 | Akieda |
| 7,682,070 B2 | 3/2010 | Burton |
| 7,708,457 B2 | 5/2010 | Girardin |
| 7,710,456 B2 | 5/2010 | Koshiba et al. |
| 7,732,724 B2 | 6/2010 | Otani et al. |
| 7,761,246 B2 | 7/2010 | Matsui |
| 7,763,819 B2 | 7/2010 | Ieda et al. |
| 7,772,507 B2 | 8/2010 | Orr |
| 7,778,115 B2 | 8/2010 | Ruchonnet |
| 7,781,726 B2 | 8/2010 | Matsui et al. |
| RE41,637 E | 9/2010 | O'Hara et al. |
| 7,791,587 B2 | 9/2010 | Kosugi |
| 7,791,588 B2 | 9/2010 | Tierling et al. |
| 7,791,597 B2 | 9/2010 | Silverstein et al. |
| 7,822,469 B2 | 10/2010 | Lo |
| 7,856,255 B2 | 12/2010 | Tsuchiya et al. |
| 7,858,583 B2 | 12/2010 | Schmidt et al. |
| 7,865,324 B2 | 1/2011 | Lindberg |
| 7,894,957 B2 | 2/2011 | Carlson |
| 7,946,758 B2 | 5/2011 | Mooring |
| 8,063,892 B2 | 11/2011 | Shahoian et al. |
| 8,138,488 B2 | 3/2012 | Grot |
| 8,143,981 B2 | 3/2012 | Washizu et al. |
| 8,167,126 B2 | 5/2012 | Stiehl |
| 8,169,402 B2 | 5/2012 | Shahoian et al. |
| 8,188,989 B2 | 5/2012 | Levin et al. |
| 8,195,313 B1 | 6/2012 | Fadell et al. |
| 8,220,987 B2 | 7/2012 | Kimura et al. |
| 8,229,535 B2 | 7/2012 | Mensinger et al. |
| 8,248,815 B2 | 8/2012 | Yang et al. |
| 8,263,886 B2 | 9/2012 | Lin et al. |
| 8,263,889 B2 | 9/2012 | Takahashi et al. |
| 8,275,327 B2 | 9/2012 | Yi et al. |
| 8,294,670 B2 | 10/2012 | Griffin et al. |
| 8,312,495 B2 | 11/2012 | Vanderhoff |
| 8,318,340 B2 | 11/2012 | Stimits |
| 8,368,677 B2 | 2/2013 | Yamamoto |
| 8,371,745 B2 | 2/2013 | Manni |
| 8,373,661 B2 | 2/2013 | Lan et al. |
| 8,405,618 B2 | 3/2013 | Colgate |
| 8,410,971 B2 | 4/2013 | Friedlander |
| 8,432,368 B2 | 4/2013 | Momeyer et al. |
| 8,439,559 B2 | 5/2013 | Luk et al. |
| 8,441,450 B2 | 5/2013 | Degner et al. |
| 8,446,713 B2 | 5/2013 | Lai |
| 8,456,430 B2 | 6/2013 | Oliver et al. |
| 8,477,118 B2 | 7/2013 | Lan et al. |
| 8,493,190 B2 | 7/2013 | Periquet et al. |
| 8,508,511 B2 | 8/2013 | Tanaka et al. |
| 8,525,777 B2 | 9/2013 | Stavely et al. |
| 8,562,489 B2 | 10/2013 | Burton et al. |
| 8,568,313 B2 | 10/2013 | Sadhu |
| 8,576,044 B2 | 11/2013 | Chapman |
| 8,593,598 B2 | 11/2013 | Chen et al. |
| 8,607,662 B2 | 12/2013 | Huang |
| 8,614,881 B2 | 12/2013 | Yoo |
| 8,624,836 B1 | 1/2014 | Miller et al. |
| 8,666,682 B2 | 3/2014 | LaVigne et al. |
| 8,677,285 B2 | 3/2014 | Tsern et al. |
| 8,704,787 B2 | 4/2014 | Yamamoto |
| 8,711,093 B2 | 4/2014 | Ong et al. |
| 8,717,151 B2 | 5/2014 | Forutanpour et al. |
| 8,724,087 B2 | 5/2014 | Van De Kerkhof et al. |
| 8,730,167 B2 | 5/2014 | Ming et al. |
| 8,743,088 B2 | 6/2014 | Watanabe |
| 8,783,944 B2 | 7/2014 | Doi |
| 8,797,153 B2 | 8/2014 | Vanhelle et al. |
| 8,804,993 B2 | 8/2014 | Shukla et al. |
| 8,810,514 B2 | 8/2014 | Zhao et al. |
| 8,816,962 B2 | 8/2014 | Obermeyer et al. |
| 8,824,245 B2 | 9/2014 | Lau et al. |
| 8,847,741 B2 | 9/2014 | Birnbaum et al. |
| 8,851,372 B2 | 10/2014 | Zhou |
| 8,859,971 B2 | 10/2014 | Weber |
| 8,860,674 B2 | 10/2014 | Lee et al. |
| 8,863,219 B2 | 10/2014 | Brown et al. |
| D717,679 S | 11/2014 | Anderssen |
| 8,878,657 B2 | 11/2014 | Periquet et al. |
| 8,885,856 B2 | 11/2014 | Sacha |
| 8,895,911 B2 | 11/2014 | Takahashi |
| 8,905,631 B2 | 12/2014 | Sakurazawa et al. |
| 8,908,477 B2 | 12/2014 | Peters |
| 8,920,022 B2 | 12/2014 | Ishida et al. |
| 8,922,399 B2 | 12/2014 | Bajaj et al. |
| 8,928,452 B2 | 1/2015 | Kim et al. |
| 8,948,832 B2 | 2/2015 | Hong et al. |
| 8,954,135 B2 | 2/2015 | Yuen et al. |
| 8,975,543 B2 | 3/2015 | Hakemeyer |
| 8,994,827 B2 | 3/2015 | Mistry et al. |
| 9,001,625 B2 | 4/2015 | Essery et al. |
| 9,010,945 B2 | 4/2015 | Vasylyev |
| 9,024,733 B2 | 5/2015 | Wouters |
| 9,028,134 B2 | 5/2015 | Koshoji et al. |
| 9,030,446 B2 | 5/2015 | Mistry et al. |
| 9,034,666 B2 | 5/2015 | Vaganov et al. |
| 9,039,614 B2 | 5/2015 | Yuen et al. |
| 9,041,663 B2 | 5/2015 | Westerman |
| 9,042,971 B2 | 5/2015 | Brumback et al. |
| 9,049,998 B2 | 6/2015 | Brumback et al. |
| 9,052,696 B2 | 6/2015 | Breuillot et al. |
| 9,086,717 B2 | 7/2015 | Meerovitsch |
| 9,086,738 B2 | 7/2015 | Leung et al. |
| 9,091,309 B2 | 7/2015 | Battlogg |
| 9,100,493 B1 | 8/2015 | Zhou |
| 9,101,184 B2 | 8/2015 | Wilson |
| 9,105,413 B2 | 8/2015 | Hiranuma et al. |
| 9,123,483 B2 | 9/2015 | Ferri et al. |
| 9,134,807 B2 | 9/2015 | Shaw et al. |
| 9,141,087 B2 | 9/2015 | Brown et al. |
| 9,176,577 B2 | 11/2015 | Jangaard et al. |
| 9,176,598 B2 | 11/2015 | Sweetser et al. |
| 9,202,372 B2 | 12/2015 | Reams et al. |
| 9,213,409 B2 | 12/2015 | Redelsheimer et al. |
| 9,223,296 B2 | 12/2015 | Yang et al. |
| 9,241,635 B2 | 1/2016 | Yuen et al. |
| 9,244,438 B2 | 1/2016 | Hoover et al. |
| 9,256,209 B2 | 2/2016 | Yang et al. |
| 9,277,156 B2 | 3/2016 | Bennett et al. |
| 9,348,322 B2 | 5/2016 | Fraser et al. |
| 9,350,850 B2 | 5/2016 | Pope et al. |
| 9,367,146 B2 | 6/2016 | Piot |
| 9,386,932 B2 | 7/2016 | Chatterjee et al. |
| 9,426,275 B2 | 8/2016 | Eim et al. |
| 9,430,042 B2 | 8/2016 | Levin |
| 9,437,357 B2 | 9/2016 | Furuki et al. |
| 9,449,770 B2 | 9/2016 | Sanford et al. |
| 9,453,939 B2 | 9/2016 | Tortora et al. |
| 9,501,044 B2 | 11/2016 | Jackson et al. |
| 9,520,100 B2 | 12/2016 | Houjou et al. |
| 9,532,723 B2 | 1/2017 | Kim |
| 9,542,016 B2 | 1/2017 | Armstrong-Muntner |
| 9,545,541 B2 | 1/2017 | Aragones et al. |
| 9,547,280 B2 | 1/2017 | Born et al. |
| 9,552,023 B2 | 1/2017 | Joo et al. |
| 9,599,964 B2 | 3/2017 | Gracia |
| 9,600,071 B2 | 3/2017 | Rothkopf |
| 9,607,505 B2 | 3/2017 | Rothkopf et al. |
| 9,620,312 B2 | 4/2017 | Ely et al. |
| 9,627,163 B2 | 4/2017 | Ely |
| 9,632,318 B2 | 4/2017 | Goto et al. |
| 9,632,537 B2 | 4/2017 | Memering |
| 9,638,587 B2 | 5/2017 | Marquas et al. |
| 9,651,922 B2 | 5/2017 | Hysek et al. |
| 9,659,482 B2 | 5/2017 | Yang et al. |
| 9,680,831 B2 | 6/2017 | Jooste et al. |
| 9,709,956 B1 | 7/2017 | Ely et al. |
| 9,753,436 B2 | 9/2017 | Ely et al. |
| D800,172 S | 10/2017 | Akana |

(56) References Cited

U.S. PATENT DOCUMENTS

| | | |
|---|---|---|
| 9,800,717 B2 | 10/2017 | Ma et al. |
| 9,836,025 B2 | 12/2017 | Ely et al. |
| 9,851,613 B2 | 12/2017 | Noble et al. |
| 9,873,711 B2 | 1/2018 | Hoover et al. |
| 9,874,945 B2 | 1/2018 | Fukumoto |
| 9,886,006 B2 | 2/2018 | Ely et al. |
| 9,891,590 B2 | 2/2018 | Shim et al. |
| 9,891,651 B2 | 2/2018 | Jackson et al. |
| 9,891,667 B2 | 2/2018 | Jung et al. |
| 9,898,032 B2 | 2/2018 | Hafez et al. |
| 9,913,591 B2 | 3/2018 | Lapetina et al. |
| 9,921,548 B2 | 3/2018 | Mitani |
| 9,927,902 B2 | 3/2018 | Burr et al. |
| 9,939,923 B2 | 4/2018 | Sharma |
| 9,946,297 B2 | 4/2018 | Nazzaro et al. |
| 9,952,558 B2 | 4/2018 | Ely |
| 9,952,682 B2 | 4/2018 | Zhang et al. |
| 9,971,305 B2 | 5/2018 | Ely et al. |
| 9,971,405 B2 | 5/2018 | Salo et al. |
| 9,971,407 B2 | 5/2018 | Holenarsipur et al. |
| 9,979,426 B2 | 5/2018 | Na et al. |
| 10,001,817 B2 | 6/2018 | Zambetti et al. |
| 10,012,550 B2 | 7/2018 | Yang |
| 10,018,966 B2 | 7/2018 | Ely et al. |
| 10,019,097 B2 | 7/2018 | Ely et al. |
| 10,037,006 B2 | 7/2018 | Ely |
| 10,037,081 B2 | 7/2018 | Grant |
| 10,048,802 B2 | 8/2018 | Shedletsky |
| 10,057,470 B2 | 8/2018 | Kim et al. |
| 10,061,399 B2 | 8/2018 | Bushnell et al. |
| 10,066,970 B2 | 9/2018 | Gowreesunker et al. |
| 10,092,203 B2 | 10/2018 | Mirov |
| 10,108,016 B2 | 10/2018 | Bosveld |
| 10,114,342 B2 | 10/2018 | Kim et al. |
| 10,145,711 B2 | 12/2018 | Boonsom et al. |
| 10,175,652 B2 | 1/2019 | Ely et al. |
| 10,190,891 B1 | 1/2019 | Rothkopf et al. |
| 10,191,455 B2 | 1/2019 | Shim et al. |
| 10,203,662 B1 | 2/2019 | Lin et al. |
| 10,209,148 B2 | 2/2019 | Lyon et al. |
| 10,216,147 B2 | 2/2019 | Ely et al. |
| 10,222,755 B2 | 3/2019 | Coakley et al. |
| 10,222,756 B2 | 3/2019 | Ely et al. |
| 10,222,909 B2 | 3/2019 | Shedletsky et al. |
| 10,234,828 B2 | 3/2019 | Ely et al. |
| 10,241,593 B2 | 3/2019 | Chen |
| 10,296,125 B2 | 5/2019 | Ely et al. |
| 10,331,081 B2 | 6/2019 | Ely et al. |
| 10,331,082 B2 | 6/2019 | Ely et al. |
| 10,332,111 B2 | 6/2019 | Mokhasi et al. |
| 10,353,487 B2 | 7/2019 | Chung et al. |
| 10,379,629 B2 | 8/2019 | Bushnell et al. |
| 10,386,940 B2 | 8/2019 | Kim |
| 10,401,961 B2 | 9/2019 | Cruz-Hernandez et al. |
| 10,429,959 B2 | 10/2019 | Battlogg |
| 10,474,194 B1 | 11/2019 | Ell et al. |
| 10,503,258 B2 | 12/2019 | Holenarsipur et al. |
| 10,509,486 B2 | 12/2019 | Bushnell et al. |
| 10,524,671 B2 | 1/2020 | Lamego |
| 10,534,320 B2 | 1/2020 | Ferri |
| 10,551,798 B1 | 2/2020 | Bushnell et al. |
| 10,572,053 B2 | 2/2020 | Ely et al. |
| 10,593,617 B2 | 3/2020 | Ashikaga et al. |
| 10,599,101 B2 | 3/2020 | Rothkopf et al. |
| 10,610,157 B2 | 4/2020 | Pandya et al. |
| 10,613,685 B2 | 4/2020 | Shedletsky |
| 10,627,783 B2 | 4/2020 | Rothkopf et al. |
| 10,655,988 B2 | 5/2020 | Boonsom et al. |
| 10,664,074 B2 | 5/2020 | Moussette et al. |
| 10,732,571 B2 | 8/2020 | Ely et al. |
| 10,765,019 B2 | 9/2020 | Werner |
| 10,840,041 B1 | 11/2020 | Harms |
| 10,845,764 B2 | 11/2020 | Ely et al. |
| 10,852,700 B2 | 12/2020 | Abramov |
| 10,852,855 B2 | 12/2020 | Niu |
| 10,871,385 B2 | 12/2020 | Kok |
| 10,884,549 B2 | 1/2021 | Shedletsky et al. |
| 10,936,071 B2 | 3/2021 | Pandya et al. |
| 10,942,491 B2 | 3/2021 | Rothkopf |
| 10,948,880 B2 | 3/2021 | Ely et al. |
| 10,955,937 B2 | 3/2021 | Bushnell et al. |
| 10,962,930 B2 | 3/2021 | Ely et al. |
| 10,962,935 B1 | 3/2021 | Ely et al. |
| 10,987,054 B2 | 4/2021 | Pandya et al. |
| 11,000,193 B2 | 5/2021 | Tal et al. |
| 11,002,572 B2 | 5/2021 | Boonsom et al. |
| 11,029,831 B2 | 6/2021 | Block et al. |
| 11,036,318 B2 | 6/2021 | Kuboyama |
| 11,148,292 B2 | 10/2021 | Bryner et al. |
| 11,181,863 B2 | 11/2021 | Ely et al. |
| 11,194,099 B2 | 12/2021 | Taylor et al. |
| 11,194,298 B2 | 12/2021 | Roach et al. |
| 11,209,777 B2 | 12/2021 | Minakuchi et al. |
| 11,221,590 B2 | 1/2022 | Rothkopf et al. |
| 11,347,189 B1 | 5/2022 | Herrera et al. |
| 11,350,869 B2 | 6/2022 | Rasmussen et al. |
| 11,360,440 B2 | 6/2022 | Perkins et al. |
| 11,385,599 B2 | 7/2022 | Ely et al. |
| 11,432,766 B2 | 9/2022 | Pandya et al. |
| 11,474,483 B2 | 10/2022 | Rothkopf |
| 11,531,306 B2 | 12/2022 | Ely et al. |
| 11,556,095 B2 | 1/2023 | Hiemstra et al. |
| 11,561,515 B2 * | 1/2023 | Beyhs ................. G04C 3/002 |
| 11,567,457 B2 | 1/2023 | Rothkopf et al. |
| 11,644,800 B2 | 5/2023 | Holenarsipur et al. |
| 11,669,205 B2 | 6/2023 | Shedletsky et al. |
| 11,674,825 B2 | 6/2023 | Li et al. |
| 11,720,064 B2 | 8/2023 | Ely |
| 11,754,981 B2 | 9/2023 | Perkins et al. |
| 11,796,961 B2 | 10/2023 | Ely et al. |
| 11,815,860 B2 | 11/2023 | Pandya et al. |
| 11,860,587 B2 | 1/2024 | Taylor et al. |
| 12,045,416 B2 | 7/2024 | Shedletsky et al. |
| 2002/0101457 A1 | 8/2002 | Lang |
| 2003/0174590 A1 | 9/2003 | Arikawa et al. |
| 2004/0047244 A1 | 3/2004 | Iino et al. |
| 2004/0082414 A1 | 4/2004 | Knox |
| 2004/0130971 A1 | 7/2004 | Ecoffet et al. |
| 2004/0264301 A1 | 12/2004 | Howard et al. |
| 2005/0075558 A1 | 4/2005 | Vecerina et al. |
| 2005/0088417 A1 | 4/2005 | Mulligan |
| 2006/0250377 A1 | 11/2006 | Zadesky et al. |
| 2007/0013775 A1 | 1/2007 | Shin |
| 2007/0050054 A1 | 3/2007 | Sambandam Guruparan et al. |
| 2007/0182708 A1 | 8/2007 | Poupyrev et al. |
| 2007/0211042 A1 | 9/2007 | Kim et al. |
| 2007/0222756 A1 | 9/2007 | Wu et al. |
| 2007/0229671 A1 | 10/2007 | Takeshita et al. |
| 2007/0242569 A1 | 10/2007 | Inoue |
| 2007/0247421 A1 | 10/2007 | Orsley et al. |
| 2008/0130914 A1 | 6/2008 | Cho |
| 2008/0181059 A1 | 7/2008 | Wai |
| 2008/0185272 A1 | 8/2008 | Otani et al. |
| 2009/0025872 A1 | 1/2009 | Nilsen et al. |
| 2009/0051649 A1 | 2/2009 | Rondel |
| 2009/0073119 A1 | 3/2009 | Le et al. |
| 2009/0115748 A1 | 5/2009 | Tanaka et al. |
| 2009/0122656 A1 | 5/2009 | Bonnet et al. |
| 2009/0146975 A1 | 6/2009 | Chang |
| 2009/0152452 A1 | 6/2009 | Lee et al. |
| 2009/0217207 A1 | 8/2009 | Kagermeier et al. |
| 2009/0285443 A1 | 11/2009 | Camp et al. |
| 2009/0312051 A1 | 12/2009 | Hansson et al. |
| 2010/0033430 A1 | 2/2010 | Kakutani et al. |
| 2010/0053468 A1 | 3/2010 | Harvill |
| 2010/0079225 A1 | 4/2010 | Washizu et al. |
| 2010/0081375 A1 | 4/2010 | Rosenblatt et al. |
| 2010/0149099 A1 | 6/2010 | Elias |
| 2011/0007468 A1 | 1/2011 | Burton et al. |
| 2011/0090148 A1 | 4/2011 | Li et al. |
| 2011/0158057 A1 | 6/2011 | Brewer et al. |
| 2011/0242064 A1 | 10/2011 | Ono et al. |
| 2011/0249378 A1 | 10/2011 | Yoo |
| 2011/0270358 A1 | 11/2011 | Davis et al. |

(56) References Cited

U.S. PATENT DOCUMENTS

| | | |
|---|---|---|
| 2012/0067711 A1 | 3/2012 | Yang |
| 2012/0068857 A1 | 3/2012 | Rothkopf et al. |
| 2012/0075082 A1 | 3/2012 | Rothkopf et al. |
| 2012/0112859 A1 | 5/2012 | Park et al. |
| 2012/0113044 A1 | 5/2012 | Strazisar et al. |
| 2012/0206248 A1 | 8/2012 | Biggs |
| 2012/0272784 A1 | 11/2012 | Bailey et al. |
| 2013/0037396 A1 | 2/2013 | Yu |
| 2013/0087443 A1 | 4/2013 | Kikuchi |
| 2013/0191220 A1 | 7/2013 | Dent et al. |
| 2013/0235704 A1 | 9/2013 | Grinberg |
| 2013/0261405 A1 | 10/2013 | Lee et al. |
| 2013/0335196 A1 | 12/2013 | Zhang et al. |
| 2014/0009397 A1 | 1/2014 | Gillespie et al. |
| 2014/0045547 A1 | 2/2014 | Singamsetty et al. |
| 2014/0071098 A1 | 3/2014 | You |
| 2014/0073486 A1 | 3/2014 | Ahmed et al. |
| 2014/0132516 A1 | 5/2014 | Tsai et al. |
| 2014/0143784 A1 | 5/2014 | Mistry |
| 2014/0197936 A1 | 7/2014 | Biggs et al. |
| 2014/0340318 A1 | 11/2014 | Stringer et al. |
| 2014/0347289 A1 | 11/2014 | Suh et al. |
| 2014/0368442 A1 | 12/2014 | Vahtola |
| 2014/0375579 A1 | 12/2014 | Fujiwara |
| 2015/0026647 A1 | 1/2015 | Park et al. |
| 2015/0041289 A1 | 2/2015 | Ely et al. |
| 2015/0049059 A1 | 2/2015 | Zadesky et al. |
| 2015/0098309 A1 | 4/2015 | Adams et al. |
| 2015/0124415 A1 | 5/2015 | Goyal et al. |
| 2015/0186609 A1 | 7/2015 | Utter, II |
| 2015/0221460 A1 | 8/2015 | Teplitxky et al. |
| 2015/0293592 A1 | 10/2015 | Cheong |
| 2015/0320346 A1 | 11/2015 | Chen |
| 2015/0338642 A1 | 11/2015 | Sanford |
| 2015/0341031 A1 | 11/2015 | Marquas et al. |
| 2015/0366098 A1 | 12/2015 | Lapetina et al. |
| 2016/0018846 A1 | 1/2016 | Zenoff |
| 2016/0054813 A1 | 2/2016 | Schediwy et al. |
| 2016/0058375 A1 | 3/2016 | Rothkopf et al. |
| 2016/0061636 A1 | 3/2016 | Gowreesunker et al. |
| 2016/0062623 A1 | 3/2016 | Howard et al. |
| 2016/0069713 A1 | 3/2016 | Ruh et al. |
| 2016/0098016 A1 | 4/2016 | Ely et al. |
| 2016/0109861 A1 | 4/2016 | Kim et al. |
| 2016/0116306 A1 | 4/2016 | Ferri et al. |
| 2016/0147432 A1 | 5/2016 | Shi et al. |
| 2016/0170598 A1 | 6/2016 | Zambetti et al. |
| 2016/0170608 A1 | 6/2016 | Zambetti et al. |
| 2016/0170624 A1 | 6/2016 | Zambetti et al. |
| 2016/0241688 A1 | 8/2016 | Vossoughi |
| 2016/0253487 A1 | 9/2016 | Sarkar et al. |
| 2016/0306446 A1 | 10/2016 | Chung et al. |
| 2016/0320583 A1 | 11/2016 | Hall, Jr. |
| 2016/0327911 A1 | 11/2016 | Eim et al. |
| 2016/0338642 A1 | 11/2016 | Parara et al. |
| 2016/0378069 A1 | 12/2016 | Rothkopf et al. |
| 2016/0378070 A1 | 12/2016 | Rothkopf et al. |
| 2017/0011210 A1 | 1/2017 | Cheong et al. |
| 2017/0027461 A1 | 2/2017 | Shin et al. |
| 2017/0031449 A1 | 2/2017 | Karsten et al. |
| 2017/0061863 A1 | 3/2017 | Eguchi |
| 2017/0069443 A1 | 3/2017 | Wang et al. |
| 2017/0069444 A1 | 3/2017 | Wang et al. |
| 2017/0069447 A1 | 3/2017 | Wang et al. |
| 2017/0089735 A1 | 3/2017 | Ruh |
| 2017/0090572 A1 | 3/2017 | Holenarsipur |
| 2017/0090599 A1 | 3/2017 | Kuboyama |
| 2017/0104902 A1 | 4/2017 | Kim et al. |
| 2017/0139489 A1 | 5/2017 | Chen et al. |
| 2017/0216519 A1 | 8/2017 | Vouillamoz |
| 2017/0216668 A1 | 8/2017 | Burton et al. |
| 2017/0238138 A1 | 8/2017 | Aminzade |
| 2017/0251561 A1 | 8/2017 | Fleck et al. |
| 2017/0269715 A1 | 9/2017 | Kim et al. |
| 2017/0285404 A1 | 10/2017 | Kubota et al. |
| 2017/0301314 A1 | 10/2017 | Kim et al. |
| 2017/0307414 A1 | 10/2017 | Ferri et al. |
| 2017/0319082 A1 | 11/2017 | Sayme |
| 2017/0331869 A1 | 11/2017 | Bendahan et al. |
| 2017/0357465 A1 | 12/2017 | Dzeryn et al. |
| 2018/0018026 A1 | 1/2018 | Bushnell et al. |
| 2018/0059624 A1 | 3/2018 | James |
| 2018/0136686 A1 | 5/2018 | Jackson et al. |
| 2018/0196517 A1 | 7/2018 | Tan et al. |
| 2018/0225701 A1 | 8/2018 | Han |
| 2018/0235491 A1 | 8/2018 | Bayley et al. |
| 2018/0337551 A1 | 11/2018 | Park |
| 2019/0025940 A1 | 1/2019 | Shim et al. |
| 2019/0056700 A1 | 2/2019 | Matsuno |
| 2019/0072911 A1 | 3/2019 | Ely et al. |
| 2019/0072912 A1 | 3/2019 | Pandya et al. |
| 2019/0082547 A1 | 3/2019 | Werner et al. |
| 2019/0088583 A1 | 3/2019 | Ashikaga et al. |
| 2019/0278232 A1 | 9/2019 | Ely et al. |
| 2019/0317454 A1 | 10/2019 | Holenarsipur et al. |
| 2019/0391539 A1 | 12/2019 | Perkins et al. |
| 2020/0041962 A1 | 2/2020 | Beyhs |
| 2020/0064774 A1 | 2/2020 | Ely et al. |
| 2020/0064779 A1 | 2/2020 | Pandya et al. |
| 2020/0073339 A1 | 3/2020 | Roach et al. |
| 2020/0085331 A1 | 3/2020 | Chou |
| 2020/0110473 A1 | 4/2020 | Bushnell et al. |
| 2020/0150815 A1 | 5/2020 | Ely et al. |
| 2020/0159172 A1 | 5/2020 | Bushnell et al. |
| 2020/0233380 A1 | 7/2020 | Rothkopf |
| 2020/0233529 A1 | 7/2020 | Shedletsky et al. |
| 2020/0310609 A1 | 10/2020 | Ham |
| 2021/0055696 A1 | 2/2021 | Ely |
| 2021/0060783 A1 | 3/2021 | Bryner et al. |
| 2021/0089136 A1 | 3/2021 | Hossain et al. |
| 2021/0096688 A1 | 4/2021 | Shedletsky et al. |
| 2021/0157278 A1 | 5/2021 | Xue |
| 2021/0181682 A1 | 6/2021 | Ely et al. |
| 2021/0181688 A1 | 6/2021 | Ely et al. |
| 2021/0181690 A1 | 6/2021 | Rothkopf et al. |
| 2021/0181691 A1 | 6/2021 | Rothkopf et al. |
| 2021/0181692 A1 | 6/2021 | Rothkopf et al. |
| 2021/0181865 A1 | 6/2021 | Bushnell et al. |
| 2021/0199475 A1 | 7/2021 | Dantler et al. |
| 2021/0255590 A1 | 8/2021 | Ely et al. |
| 2021/0325168 A1 | 10/2021 | Lv et al. |
| 2021/0353226 A1 | 11/2021 | Hiemstra |
| 2021/0373501 A1 | 12/2021 | Pandya et al. |
| 2021/0405594 A1 | 12/2021 | Holenarsipur et al. |
| 2022/0043397 A1 | 2/2022 | Ely et al. |
| 2022/0043402 A1 | 2/2022 | Roach et al. |
| 2022/0074731 A1 | 3/2022 | Jang et al. |
| 2022/0075328 A1 | 3/2022 | Taylor |
| 2022/0261111 A1 | 8/2022 | Shedletsky et al. |
| 2022/0299944 A1 | 9/2022 | Ely |
| 2022/0326660 A1 | 10/2022 | Perkins |
| 2022/0413446 A1 | 12/2022 | Rothkopf et al. |
| 2023/0012897 A1 | 1/2023 | Bushnell et al. |
| 2023/0013283 A1* | 1/2023 | Herrera ............... G01P 3/36 |
| 2023/0028554 A1 | 1/2023 | Rothkopf et al. |
| 2023/0077241 A1 | 3/2023 | Pandya et al. |
| 2023/0097827 A1 | 3/2023 | Rothkopf et al. |
| 2023/0101015 A1 | 3/2023 | Ely et al. |
| 2023/0161299 A1 | 5/2023 | Beyhs |
| 2023/0168635 A1 | 6/2023 | Hiemstra et al. |
| 2023/0213893 A1 | 7/2023 | Rothkopf et al. |
| 2023/0341819 A1 | 7/2023 | Ely et al. |
| 2023/0258479 A1 | 8/2023 | Li et al. |
| 2023/0259235 A1 | 8/2023 | Shedletsky et al. |
| 2023/0273572 A1 | 8/2023 | Holenarsipur et al. |
| 2023/0393536 A1 | 12/2023 | Perkins et al. |
| 2023/0418230 A1 | 12/2023 | Ely et al. |
| 2024/0036523 A1 | 2/2024 | Pandya et al. |
| 2024/0045383 A1 | 2/2024 | Roach et al. |
| 2024/0053707 A1 | 2/2024 | Ely et al. |
| 2024/0126219 A1 | 4/2024 | Taylor et al. |
| 2024/0152100 A1 | 5/2024 | Beyhs |

(56) References Cited

U.S. PATENT DOCUMENTS

| | | | |
|---|---|---|---|
| 2024/0192804 A1 | 6/2024 | Shedletsky et al. | |
| 2024/0264568 A1 | 8/2024 | Ely | |
| 2024/0264569 A1 | 8/2024 | Davis et al. | |

FOREIGN PATENT DOCUMENTS

| | | |
|---|---|---|
| CH | 706101 | 8/2013 |
| CN | 1302740 | 9/2001 |
| CN | 1445627 | 10/2003 |
| CN | 1504843 | 6/2004 |
| CN | 1601408 | 3/2005 |
| CN | 1624427 | 6/2005 |
| CN | 1792295 | 6/2006 |
| CN | 1825224 | 8/2006 |
| CN | 101035148 | 9/2007 |
| CN | 101201587 | 6/2008 |
| CN | 201081979 | 7/2008 |
| CN | 101404928 | 4/2009 |
| CN | 201262741 | 6/2009 |
| CN | 101641663 | 2/2010 |
| CN | 101750958 | 6/2010 |
| CN | 201638168 | 11/2010 |
| CN | 101923314 | 12/2010 |
| CN | 102067070 | 5/2011 |
| CN | 102216959 | 10/2011 |
| CN | 202008579 | 10/2011 |
| CN | 102590925 | 7/2012 |
| CN | 102741772 | 10/2012 |
| CN | 102890443 | 1/2013 |
| CN | 202710937 | 1/2013 |
| CN | 103177891 | 6/2013 |
| CN | 103191557 | 7/2013 |
| CN | 103253067 | 8/2013 |
| CN | 103645804 | 3/2014 |
| CN | 203564224 | 4/2014 |
| CN | 103852090 | 6/2014 |
| CN | 203630524 | 6/2014 |
| CN | 103919536 | 7/2014 |
| CN | 103956006 | 7/2014 |
| CN | 203693601 | 7/2014 |
| CN | 203705837 | 7/2014 |
| CN | 203732900 | 7/2014 |
| CN | 103995456 | 8/2014 |
| CN | 104020660 | 9/2014 |
| CN | 203941395 | 11/2014 |
| CN | 104777987 | 4/2015 |
| CN | 104685794 | 6/2015 |
| CN | 204479929 | 7/2015 |
| CN | 204496177 | 7/2015 |
| CN | 104880937 | 9/2015 |
| CN | 104898406 | 9/2015 |
| CN | 204650147 | 9/2015 |
| CN | 105022947 | 11/2015 |
| CN | 105096979 | 11/2015 |
| CN | 105339871 | 2/2016 |
| CN | 105446125 | 3/2016 |
| CN | 205121417 | 3/2016 |
| CN | 105547146 | 5/2016 |
| CN | 105556433 | 5/2016 |
| CN | 105683876 | 6/2016 |
| CN | 105683877 | 6/2016 |
| CN | 105760067 | 7/2016 |
| CN | 105955519 | 9/2016 |
| CN | 205645648 | 10/2016 |
| CN | 205721636 | 11/2016 |
| CN | 205750744 | 11/2016 |
| CN | 106236051 | 12/2016 |
| CN | 106557218 | 4/2017 |
| CN | 206147524 | 5/2017 |
| CN | 206209589 | 5/2017 |
| CN | 107111342 | 8/2017 |
| CN | 107122088 | 9/2017 |
| CN | 107966895 | 4/2018 |
| CN | 209560397 | 10/2019 |
| CN | 209625187 | 11/2019 |
| CN | 111752138 | 10/2020 |
| CN | 215494568 | 1/2022 |
| CN | 114220694 | 3/2022 |
| CN | 106125968 | 11/2022 |
| CN | 218675709 | 3/2023 |
| DE | 2352016 | 4/1975 |
| DE | 3706194 | 9/1988 |
| DE | 102008023651 | 11/2009 |
| DE | 102016215087 | 3/2017 |
| EP | 0165548 | 12/1985 |
| EP | 0556155 | 8/1993 |
| EP | 1345095 | 9/2003 |
| EP | 1519452 | 3/2005 |
| EP | 1669724 | 6/2006 |
| EP | 1832969 | 9/2007 |
| EP | 2375295 | 10/2011 |
| EP | 2579186 | 4/2013 |
| EP | 2720129 | 4/2014 |
| EP | 2884239 | 6/2015 |
| FR | 2030093 | 10/1970 |
| FR | 2801402 | 5/2001 |
| GB | 887369 | 1/1962 |
| GB | 2433211 | 6/2007 |
| JP | S52151058 | 12/1977 |
| JP | S52164551 | 12/1977 |
| JP | S53093067 | 8/1978 |
| JP | S5478178 | 6/1979 |
| JP | S54087779 | 6/1979 |
| JP | S5708582 | 1/1982 |
| JP | S5734457 | 2/1982 |
| JP | S60103936 | 6/1985 |
| JP | S60103937 | 6/1985 |
| JP | H02285214 | 11/1990 |
| JP | H04093719 | 3/1992 |
| JP | H04157319 | 5/1992 |
| JP | H05203465 | 8/1993 |
| JP | H05312595 | 11/1993 |
| JP | H06050927 | 12/1994 |
| JP | H06331761 | 12/1994 |
| JP | H06347293 | 12/1994 |
| JP | H07116141 | 5/1995 |
| JP | H0914941 | 1/1997 |
| JP | H10161811 | 6/1998 |
| JP | H11121210 | 4/1999 |
| JP | H11191508 | 7/1999 |
| JP | 2000258559 | 9/2000 |
| JP | 2000316824 | 11/2000 |
| JP | 2000337892 | 12/2000 |
| JP | 2001084934 | 3/2001 |
| JP | 2001167651 | 6/2001 |
| JP | 2001202178 | 7/2001 |
| JP | 2001215288 | 8/2001 |
| JP | 2001289977 | 10/2001 |
| JP | 2001524206 | 11/2001 |
| JP | 2002071480 | 3/2002 |
| JP | 2002165768 | 6/2002 |
| JP | 2003036144 | 2/2003 |
| JP | 2003050668 | 2/2003 |
| JP | 2003151410 | 5/2003 |
| JP | 2003215271 | 7/2003 |
| JP | 2003331693 | 11/2003 |
| JP | 2004079410 | 3/2004 |
| JP | 2004184396 | 7/2004 |
| JP | 2004028979 | 11/2004 |
| JP | 2005017011 | 1/2005 |
| JP | 2005063200 | 3/2005 |
| JP | 2005099023 | 4/2005 |
| JP | 2005108630 | 4/2005 |
| JP | 2006101505 | 4/2006 |
| JP | 2006164275 | 6/2006 |
| JP | 3852854 | 12/2006 |
| JP | 2007101380 | 4/2007 |
| JP | 2007149620 | 6/2007 |
| JP | 2007248176 | 9/2007 |
| JP | 2007285748 | 11/2007 |
| JP | 2007311153 | 11/2007 |
| JP | 2008053980 | 3/2008 |
| JP | 2008122124 | 5/2008 |
| JP | 2008122377 | 5/2008 |

(56) References Cited

FOREIGN PATENT DOCUMENTS

| | | |
|---|---|---|
| JP | 2008170436 | 7/2008 |
| JP | 2008235226 | 10/2008 |
| JP | 2009009382 | 1/2009 |
| JP | 2009070657 | 4/2009 |
| JP | 2009519737 | 5/2009 |
| JP | 2009540399 | 11/2009 |
| JP | 2010032545 | 2/2010 |
| JP | 2010515153 | 5/2010 |
| JP | 2010165001 | 7/2010 |
| JP | 2010186572 | 8/2010 |
| JP | 2010243344 | 10/2010 |
| JP | 2010244797 | 10/2010 |
| JP | 2011021929 | 2/2011 |
| JP | 2011165468 | 8/2011 |
| JP | 2011221659 | 11/2011 |
| JP | 2012053801 | 3/2012 |
| JP | 2012221905 | 11/2012 |
| JP | 2013057516 | 3/2013 |
| JP | 2013079961 | 5/2013 |
| JP | 2013524189 | 6/2013 |
| JP | 3190075 | 4/2014 |
| JP | 5477393 | 4/2014 |
| JP | 2014512556 | 5/2014 |
| JP | 2014112222 | 6/2014 |
| JP | 2014174031 | 9/2014 |
| JP | 2017219448 | 12/2017 |
| JP | 2018510451 | 4/2018 |
| KR | 20010030477 | 4/2001 |
| KR | 200278568 | 3/2002 |
| KR | 20070011685 | 1/2007 |
| KR | 20070014247 | 2/2007 |
| KR | 100754674 | 9/2007 |
| KR | 20080028935 | 4/2008 |
| KR | 20080045397 | 5/2008 |
| KR | 100849684 | 8/2008 |
| KR | 1020080111563 | 12/2008 |
| KR | 2020100007563 | 7/2010 |
| KR | 20110011393 | 2/2011 |
| KR | 20110012784 | 2/2011 |
| KR | 20110103761 | 9/2011 |
| KR | 20110113368 | 10/2011 |
| KR | 20130036038 | 4/2013 |
| KR | 20130131873 | 12/2013 |
| KR | 20140051391 | 4/2014 |
| KR | 20140064689 | 5/2014 |
| KR | 20140104388 | 8/2014 |
| KR | 20160017070 | 2/2016 |
| KR | 20160048967 | 5/2016 |
| KR | 20170106395 | 9/2017 |
| KR | 10-2020-0027010 | 3/2020 |
| KR | 102136836 | 7/2020 |
| NL | 1040225 | 11/2014 |
| RO | 129033 | 11/2013 |
| TW | 200633681 | 10/2006 |
| WO | WO2001/022038 | 3/2001 |
| WO | WO2001/069567 | 9/2001 |
| WO | WO2003/032538 | 4/2003 |
| WO | WO 10/001299 | 1/2010 |
| WO | WO2010/058376 | 5/2010 |
| WO | WO2012/083380 | 6/2012 |
| WO | WO2012/094805 | 7/2012 |
| WO | WO2014/018118 | 1/2014 |
| WO | WO2014/200766 | 12/2014 |
| WO | WO2015/034149 | 3/2015 |
| WO | WO 15/122885 | 8/2015 |
| WO | WO2015/116111 | 8/2015 |
| WO | WO2015/147756 | 10/2015 |
| WO | WO2016080669 | 5/2016 |
| WO | WO2016/104922 | 6/2016 |
| WO | WO2016155761 | 10/2016 |
| WO | WO 16/208835 | 12/2016 |
| WO | WO2016196171 | 12/2016 |
| WO | WO2016208835 | 12/2016 |
| WO | WO2017013278 | 1/2017 |
| WO | WO 18/236553 | 12/2018 |
| WO | WO2020173085 | 9/2020 |

OTHER PUBLICATIONS

Author Unknown, "Fossil Q ups smartwatch game with handsome design and build," Business Mirror, Makati City, Philippines, 3 pages, Dec. 20, 2016.

Author Unknown, "How Vesag Helps Kids Women and Visitors," http://www.sooperarticles.com/health-fitness-articles/children-health-articles/how-vesag-helps-kids-women-visitors-218542.html, 2 pages, at least as early as May 20, 2015.

Author Unknown, "mHealth," http://mhealth.vesag.com/?m=201012, 7 pages, Dec. 23, 2010.

Author Unknown, "mHealth Summit 2010," http://www.virtualpressoffice.com/eventsSubmenu.do?page=exhibitorPage&showId=1551&companyId=5394, 5 pages, Nov. 18, 2010.

Author Unknown, "MyKronoz ZeTime: World's Most Funded Hybrid Smartwatch Raised over $3M on Kickstarter, Running until Apr. 27," Business Wire, New York, New York, 3 pages, Apr. 21, 2017.

Author Unknown, "RedEye mini Plug-in Universal Remote Adapter for iPhone, iPod touch and iPad," Amazon.com, 4 pages, date unknown.

Author Unknown, "Re iPhone Universal Remote Control—Infrared Remote Control Accessory for iphone and ipod touch," http://www.amazon.com/iPhone-Universal-Remote-Control-Accessory/dp/tech-data/B0038Z4 . . . , 2 pages, at least as early as Jul. 15, 2010.

Author Unknown, "Vesag Wrist Watch for Dementia Care from VYZIN," http://vyasa-kaaranam-ketkadey.blogspot.com/2011/03/vesag-wrist-watch-for-dementia-care.html, 2 pages, Mar. 31, 2011.

Author Unknown, Vyzin Electronics Private Limited launches "Vesag Watch," http://www.virtualpressoffice.com/showJointPage.do?page=jp&showId=1544, 5 pages, Jan. 6, 2011.

Author Unknown, "Vyzin Unveiled Personal Emergency Response System (PERS) with Remote Health Monitoring That Can Be Used for Entire Family," http://www.24-7pressrelease.com/press-release/vyzin-unveiled-personal-emergency-response-system-pers-with-remote-health-monitoring-that-can-be-used-for-entire-family-219317.php, 2 pages, Jun. 17, 2011.

Author Unknown, "DeskThorityNet, Optical Switch Keyboards," http://deskthority.net/keyboards-f2/optical-switch-keyboards-t1474.html, 22 pages, Jul. 11, 2015.

Epstein et al., "Economical, High-Performance Optical Encoders," Hewlett-Packard Journal, pp. 99-106, Oct. 1988. [text only version].

GreyB, "Google Watch: Convert your arm into a keyboard," http://www.whatafuture.com/2014/02/28/google-smartwatch/#sthash.Yk35cDXK.dpbs, 3 pages, Feb. 28, 2014.

IBM, "Additional Functionality Added to Cell Phone via "Learning" Function Button," www.ip.com, 2 pages, Feb. 21, 2007.

Kim, Joseph, "2010 mHealth Summit Emerges as Major One-Stop U.S. Venue for Mobile Health," http://www.medicineandtechnology.com/2010/08/2010-mhealth-summit-emerges-as-major.html, 3 pages, Aug. 26, 2010.

Krishnan et al., "A Miniature Surface Mount Reflective Optical Shaft Encoder," Hewlett-Packard Journal, Article 8, pp. 1-6, Dec. 1996.

Narayanaswami et al., "Challenges and considerations for the design and production of a purpose-optimized body-worn wrist-watch computer," Defense, Security, and Cockpit Displays, 2004.

M.T. Raghunath et al., User Interfaces for Applications on a Wrist Watch, Personal and Ubiquitous Computing, vol. 6, No. 1, 2002, Springer.

Rick, "How VESAG Helps Health Conscious Citizens," http://sensetekgroup.com/2010/11/29/wireless-health-monitoring-system/, 2 pages, Nov. 29, 2010.

Sadhu, Rajendra, "How VESAG Helps People Who Want to 'Be There'?," http://ezinearticles.com/?How-Vesag-Helps-People-Who-Want-to-Be-There?&id=5423873, 1 page, Nov. 22, 2010.

(56) References Cited

OTHER PUBLICATIONS

Sadhu, Rajendra, "Mobile Innovation Helps Dementia and Alzheimer's Patients," http://www.itnewsafrica.com/2010/11/mobile-innovation-helps-dementia-andalzheimer%E2%80%99s-patients/, 3 pages, Nov. 22, 2010.
Sherr, Sol, "Input Devices," p. 55, Mar. 1988.
Tran et al., "Universal Programmable Remote Control/Telephone," www.ip.com, 2 pages, May 1, 1992.

\* cited by examiner

ROTATION SENSOR FOR A CROWN OF AN ELECTRONIC WATCH

FIELD

The described embodiments relate generally to electronic devices, and more particularly to a crown for a wearable electronic device.

BACKGROUND

Electronic devices frequently use physical input devices to facilitate user interaction. For example, buttons, keys, dials, and the like can be physically manipulated by users to control operations of the device. Physical input devices may use various types of sensing mechanisms to translate the physical manipulation to signals usable by the electronic device. For example, buttons and keys may use collapsible dome switches to detect presses, while dials and other rotating input devices may use encoders or resolvers to detect rotational movements.

SUMMARY

An electronic watch may include a housing and a crown configured to receive a rotational input. The crown may include a knob external to the housing, a rotor coupled to the knob and configured to rotate in response to the rotational input. The rotor may define a recess extending about a circumference of the rotor. The crown may include a coating positioned in the recess and configured to reflect at least a portion of light incident on the coating. The electronic watch may further include an optical sensing system configured to detect the rotational input using the reflected portion of the light.

The crown may further include a shaft coupling the knob to the rotor, the coating may have a substantially uniform thickness, and the coating may define an exterior surface that is substantially flush with a circumferential surface of the rotor. The recess may have a substantially uniform depth greater than about 20 microns. The recess may have a substantially uniform depth greater than about 50 microns. The coating may include titanium dioxide. The coating may define a cylindrical outer surface, and the coating may have a substantially uniform reflectance along its cylindrical outer surface.

The optical sensing system may include a laser emitter configured to direct a laser beam onto the coating, the reflected portion of the light may be a reflected portion of the laser beam, and the optical sensing system may determine a speed and a direction of the rotational input using self-mixing laser interferometry.

The crown may be further configured to receive a translational input, and the rotor may translate from a first position to a second position in response to the translational input. The optical sensing system may be configured to direct a light beam onto the coating. In the first position, the light beam directed onto the coating may be incident on a first location of the coating, and in the second position, the light beam directed onto the coating may be incident on a second location of the coating.

A wearable electronic device may include a housing having a side wall and an opening in the side wall, and a crown configured to receive a rotational input. The crown may include a knob positioned along a side of the housing, a shaft assembly coupled to the knob and extending through the opening in the side wall, and a coating positioned in a recess defined along a circumferential surface of the shaft assembly and configured to reflect light. The wearable electronic device may further include an optical sensing system configured to receive the light reflected from the coating and detect the rotational input using the light reflected from the coating. The recess may have a substantially uniform depth. An exterior surface of the coating may be substantially flush with the circumferential surface of the shaft assembly. The crown may be further configured to receive a translational input and the shaft assembly may be configured to actuate a switch in response to the translational input.

The optical sensing system may be further configured to direct light onto the coating and produce a signal corresponding to a rotational motion of the coating, the signal based at least in part on an interference between the light directed onto the coating and the light reflected from the coating. A beam axis of the light directed onto the coating may be oblique to the coating.

An electronic watch may include a housing and a crown configured to receive a rotational input. The crown may include a rotor configured to rotate in response to the rotational input and defining a recess extending about a circumference of the rotor, and a reflective material positioned in the recess. The electronic watch may further include an optical sensing system configured to direct light onto the reflective material, receive a reflected portion of the light, the reflected portion of the light reflected from the reflective material, and determine a characteristic of the rotational input based on the reflected portion of the light.

The recess may be defined by a first side surface, a second side surface opposite the first side surface, and a bottom surface. The first side surface and the second side surface may be substantially perpendicular to the bottom surface.

The reflective material may include titanium dioxide and a binder material. The light directed onto the reflective material may include a laser beam, the reflected portion of the light may be a reflected portion of the laser beam, and the optical sensing system may include a laser module configured to emit the laser beam and receive the reflected portion of the laser beam.

The laser module may detect a difference in frequency between the emitted laser beam and the reflected portion of the laser beam, and the characteristic of the rotational input may be based at least in part on the difference in the frequency.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
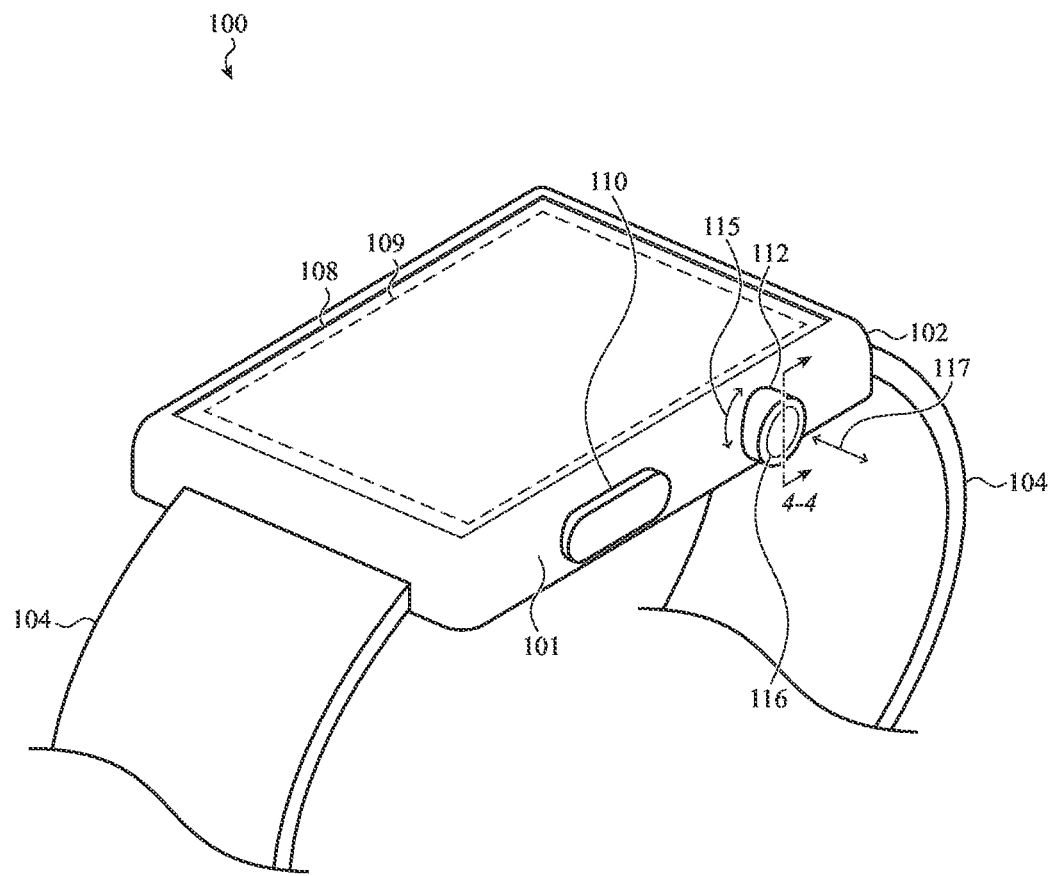
FIGS. 1A-1B depict an example wearable electronic device.

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The embodiments herein are generally directed to a crown of a wearable electronic device, such as an electronic watch (also referred to as a "smart watch" or simply a "watch"), and more particularly to a crown that can be manipulated by a user to provide inputs to the device. For example, the crown may accept rotational inputs, by which a user spins, twists, turns, or otherwise rotates the crown about a rotation axis. Rotational inputs may be used to control operations of the device. For example, a rotational input may modify a graphical display of the device in accordance with a direction of rotation of the crown, such as to scroll through lists, select or move graphical objects, move a cursor among objects on a display, or the like. The crown may also accept translational inputs, by which a user pushes or presses on the end of the crown (e.g., along, or parallel to, the rotation axis). Translational inputs may be used to indicate a selection of an item displayed on a display, change a display mode (e.g., to activate a display), change between or among graphical interface modes, or the like. In some cases, a crown may also act as a contact point for a sensor, such as a biometric sensor, of the device. For example, a smart watch may include any or all of a heart rate sensor, an electrocardiograph sensor, a thermometer, a photoplethysmograph sensor, a fingerprint sensor, or the like, all of which are examples of biometric sensors that measure or detect some aspect of a user's body. Such sensors may require direct contact with the user's body, such as via a finger. Accordingly, the crown may include an external component, such as a window, electrode, or the like, that a user may touch in order to allow the biometric sensor to take a reading or measurement. In some cases, electrical signals may be transmitted through the crown to internal sensors via a conductive path defined by and/or through the crown.

In order to respond to a rotational input applied to a crown, a sensing system is used to detect the speed and/or direction of the crown. Described herein are optical sensing systems that can detect the speed and direction of a crown rotation using light reflected from a rotating surface of the crown. For example, an optical sensing system may emit light (e.g., a laser beam) onto a rotating surface of the crown, and receive a portion of the light that is reflected from the rotating surface. Based at least in part on the reflected light, the optical sensing system can determine one or more characteristics of the crown rotation.

In some cases, the optical reflectance of the reflective surface impacts the design and/or operation of the optical sensing system. For example, a greater optical reflectance may result in a greater proportion of the emitted light being reflected and received by the optical sensing system, which can improve operational parameters of the optical sensing system, such as signal-to-noise ratio, power efficiency, and the like. Accordingly, as described herein, reflective coatings, such as a white paint pigmented with titanium dioxide or other reflective material, may be applied to a rotating structure of a crown in order to achieve a target optical reflectance for the optical rotation sensing system. More particularly, the reflective coatings may be configured to reflect at least a portion of light incident thereon towards an optical sensing system, which uses the reflected light to determine characteristics of the rotation of the crown.

Additionally, the uniformity (or lack thereof) of the optical reflectance of the reflective surface can impact the operation of the optical sensing system. For example, a surface with greater variation in reflectance (e.g., in which the optical reflectance of the reflective surface is different in different locations) may decrease the accuracy and/or precision of the optical sensor. Such effects may result in a poor user experience and/or may cause the optical sensors to fail to achieve a performance criteria. Accordingly, as described herein, a rotating component of a crown may be configured with physical features that produce a reflective surface with a high degree of optical (e.g., reflective) uniformity.

For example, a shaft or other rotating component of a crown may include a recess that extends about a circumference of the shaft and in which a reflective material is located or deposited. The recess may be configured to result in a reflective coating, formed from the reflective material, having a substantially uniform thickness and a substantially uniform roundness (among other tight dimensional tolerances), thus facilitating accurate and precise rotation measurements. In particular, a coating, such as a paint, may tend to form a curved or otherwise irregular exterior surface when applied to a surface, such as the surface of a shaft. In some cases, a curved surface corresponds to or results in a nonuniform thickness of the coating, in which the coating is thicker towards the center or middle of the coating, and thinner at the edges. This nonuniformity may negatively impact rotation sensing functionality due to the difference in reflectance (caused by differing coating thickness) at different locations on the coating. By forming a recess, the material of the coating may be constrained in such a manner that the thickness of the coating is substantially uniform and the surface of the coating is substantially flat, resulting in greater uniformity in reflectance across the entire coating. Recesses may be formed by machining a recess in a surface of a smooth cylindrical shaft surface, or by forming ridges or flanges on a shaft to define a recess therebetween. Other techniques for forming or defining a recess are also described herein.

Additionally, manufacturing and assembly efficiency of rotation sensing systems may be improved by achieving a high degree of dimensional (and thus reflective) uniformity. For example, greater reflective uniformity of the reflective surface may allow the optical emitter and the reflective surface to accommodate larger positioning tolerances (e.g., due to manufacturing and/or assembly tolerances) without negatively affecting the performance of the optical sensor.

FIG. 1A depicts an electronic device 100 (also referred to herein simply as a device 100). The device 100 is depicted as a watch, though this is merely one example embodiment of an electronic device, and the concepts discussed herein may apply equally or by analogy to other electronic devices, including mobile phones (e.g., smartphones), tablet computers, notebook computers, head-mounted displays, headphones, earbuds, digital media players (e.g., mp3 players), or the like.

The device 100 includes a housing 102 and a band 104 coupled to the housing. The housing 102 may at least partially define an internal volume in which components of the device 100 may be positioned. The housing 102 may also define one or more exterior surfaces of the device, such as all or a portion of one or more side surfaces, a rear surface, a front surface, and the like. The housing 102 may be formed of any suitable material, such as metal (e.g., aluminum, steel, titanium, or the like), ceramic, polymer, glass, or the like. The band 104 may attach the device 100 to a user, such as to the user's arm or wrist. The device 100 may include battery charging components within the device 100, which may receive power, charge a battery of the device 100, and/or provide direct power to operate the device 100 regardless of the battery's state of charge (e.g., bypassing the battery of the device 100). The device 100 may include a magnet, such as a permanent magnet, that magnetically couples to a magnet (e.g., a permanent magnet, electromagnet) or magnetic material (e.g., a ferromagnetic material such as iron, steel, or the like) in a charging dock (e.g., to facilitate wireless charging of the device 100).

The device 100 also includes a transparent cover 108 coupled to the housing 102. The cover 108 may define a front face of the device 100. For example, in some cases, the cover 108 defines substantially the entire front face and/or front surface of the device. The cover 108 may also define an input surface of the device 100. For example, as described herein, the device 100 may include touch and/or force sensors that detect inputs applied to the cover 108. The cover may be formed from or include glass, sapphire, a polymer, a dielectric, or any other suitable material.

The cover 108 may overlie at least part of a display 109 that is positioned at least partially within the internal volume of the housing 102. The display 109 may define an output region in which graphical outputs are displayed. Graphical outputs may include graphical user interfaces, user interface elements (e.g., buttons, sliders, etc.), text, lists, photographs, videos, or the like. The display 109 may include a liquid crystal display (LCD), an organic light emitting diode display (OLED), or any other suitable components or display technologies.

The display 109 may include or be associated with touch sensors and/or force sensors that extend along the output region of the display and which may use any suitable sensing elements and/or sensing systems and/or techniques. Using touch sensors, the device 100 may detect touch inputs applied to the cover 108, including detecting locations of touch inputs, motions of touch inputs (e.g., the speed, direction, or other parameters of a gesture applied to the cover 108), or the like. Using force sensors, the device 100 may detect amounts or magnitudes of force associated with touch events applied to the cover 108. The touch and/or force sensors may detect various types of user inputs to control or modify the operation of the device, including taps, swipes, multi-finger inputs, single- or multi-finger touch gestures, presses, and the like. Touch and/or force sensors usable with wearable electronic devices, such as the device 100, are described herein with respect to FIG. 11.

The device 100 also includes a crown 112 having a knob, external portion, or component(s) or feature(s) positioned along a side wall 101 of the housing 102. At least a portion of the crown 112 (e.g., a knob 208, FIG. 2) may protrude from and/or be generally external to the housing 102 and may define a generally circular shape or a circular exterior surface. The exterior surface of the crown 112 (or a portion thereof) may be textured, knurled, grooved, or may otherwise have features that may improve the tactile feel of the crown 112. At least a portion of the exterior surface of the crown 112 may also be conductively coupled to biometric sensing circuitry (or circuitry of another sensor that uses a conductive path to an exterior surface), as described herein.

The crown 112 may facilitate a variety of potential user interactions. For example, the crown 112 may be rotated by a user (e.g., the crown may receive rotational inputs). The arrow 115 in FIG. 1A illustrates example direction(s) of rotational inputs to the crown 112. Rotational inputs to the crown 112 may zoom, scroll, rotate, or otherwise manipulate a user interface or other object displayed on the display 109 (among other possible functions). The crown 112 may also be translated or pressed (e.g., axially) by the user, as indicated by arrow 117. Translational or axial inputs may select highlighted objects or icons, cause a user interface to return to a previous menu or display, or activate or deactivate functions (among other possible functions). As described herein, rotational inputs may be sensed using an optical sensing system that uses light reflected by a rotating surface of the crown 112 to determine characteristics (e.g., the speed and/or direction) of the rotational inputs. For example, light may be directed onto a rotating surface of the crown 112, and at least a portion of that light may be reflected by the rotating surface and detected by the sensing system. The sensing system may use the reflected light to determine characteristics of the rotational inputs. In some cases, the sensing system may use self-mixing laser interferometry to determine characteristics of the rotational inputs. In such cases, interference (or other interaction) between a laser beam that is directed onto a rotating surface and the laser light that is reflected from the rotating surface back into the laser source may be used to determine the characteristics. Other types of optical sensing systems may be used instead of or in addition to self-mixing laser interferometry. For example, an image sensor may be used to detect characteristics of the rotational inputs by analyzing images of the rotating surface.

The crown 112 may also include or define an input feature 116 that facilitates input to biometric sensing circuitry or other sensing circuitry within the device 100. The input feature 116 may be a conductive surface that is conductively coupled, via one or more components of the device 100, to the biometric sensing circuitry. The input feature 116 may be a conductive member (e.g., a cap or disk) that is part of the crown 112. In some cases, the input feature 116 and/or the component(s) that define the input feature 116 are electrically isolated from other components of the device 100. For example, the input feature 116 may be electrically isolated from the housing 102. In this way, the conductive path from the input feature 116 to the biometric sensing circuitry may be isolated from other components that may otherwise reduce the effectiveness of the biometric sensor. In order to provide an input to the biometric sensor, a user may place a finger or other body part on the input feature 116. The biometric sensor may be configured to take a reading or measurement in response to detecting that the user has placed a finger or other body part on the input feature 116. In some cases, the biometric sensor may only take a reading or measurement when a sensing function is separately initiated by a user (e.g., by activating the function via a graphical user interface). In other cases, a reading or measurement is taken any time the user contacts the input feature 116 (e.g., to provide a rotational or translational input to the crown 112). The user may have full control over when the biometric sensor takes measurements or readings and may even have the option to turn off the biometric sensing functionality entirely.

The device 100 may also include one or more haptic actuators that are configured to produce a tactile output through the crown 112. For example, the haptic actuator may be coupled to the crown 112 and may be configured to impart a force to the crown 112. The force may cause the crown 112 to move (e.g., to oscillate or vibrate translationally and/or rotationally, or to otherwise move to produce a tactile output), which may be detectable by a user when the user is contacting the crown 112. The haptic actuator may produce tactile output by moving the crown 112 in any suitable way. For example, the crown 112 (or a component thereof) may be rotated (e.g., rotated in a single direction, rotationally oscillated, or the like), translated (e.g., moved along a single axis), or pivoted (e.g., rocked about a pivot point). In other cases, the haptic actuator may produce tactile outputs using other techniques, such as by imparting a force to the housing 102 (e.g., to produce an oscillation, vibration, impulse, or other motion), which may be perceptible to a user through the crown 112 and/or through other surfaces of the device 100, such as the cover 108, the housing 102, or the like. Any suitable type of haptic actuator and/or technique for producing tactile output may be used to produce these or other types of tactile outputs, including electrostatics, piezoelectric actuators, oscillating or rotating masses, ultrasonic actuators, reluctance force actuators, voice coil motors, Lorentz force actuators, or the like.

Tactile outputs may be used for various purposes. For example, tactile outputs may be produced when a user presses the crown 112 (e.g., applies an axial force to the crown 112) to indicate that the device 100 has registered the press as an input to the device 100. As another example, tactile outputs may be used to provide feedback when the device 100 detects a rotation of the crown 112 or a gesture being applied to the crown 112. For example, a tactile output may produce a repetitive "click" sensation as the user rotates the crown 112 or applies a gesture to the crown 112. Tactile outputs may be used for other purposes as well.

The device 100 may also include other inputs, switches, buttons, or the like. For example, the device 100 includes a button 110. The button 110 may be a movable button (as depicted) or a touch-sensitive region of the housing 102. The button 110 may control various aspects of the device 100. For example, the button 110 may be used to select icons, items, or other objects displayed on the display 109, to activate or deactivate functions (e.g., to silence an alarm or alert), or the like.

Figure 1B:
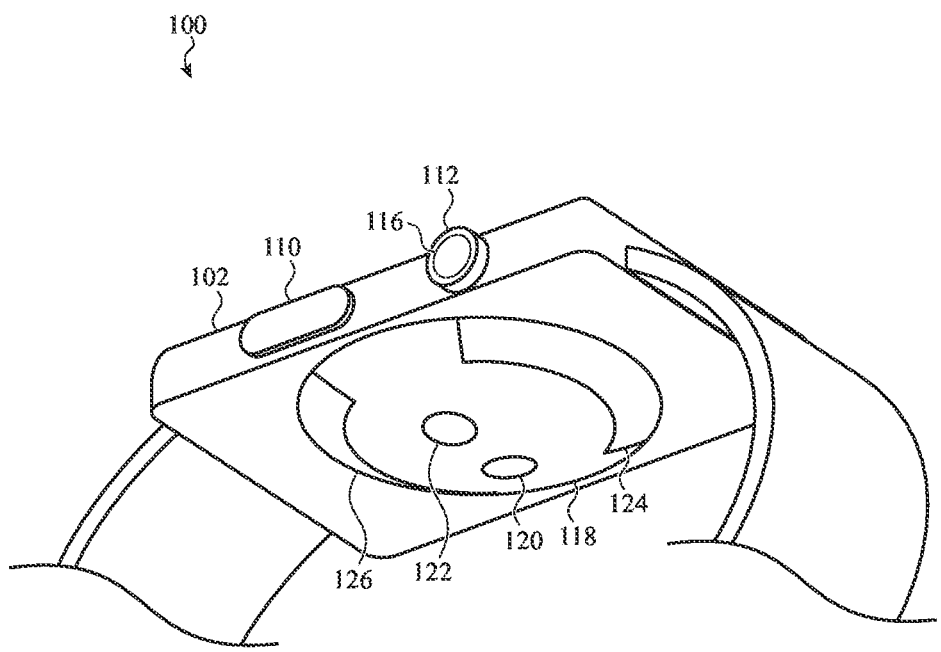

FIG. 1B shows a rear side of the device 100. The device 100 includes a rear cover 118 coupled to the housing 102 and defining at least a portion of the rear exterior surface of the device 100. The rear cover 118 may be formed of or include any suitable material(s), such as sapphire, polymer, ceramic, glass, or any other suitable material.

The rear cover 118 may define a plurality of windows to allow light to pass through the rear cover 118 to and from sensor components within the device 100. For example, the rear cover 118 may define an emitter window 120 and a receiver window 122. While only one each of the emitter and receiver windows are shown, more emitter and/or receiver windows may be included (with corresponding additional emitters and/or receivers within the device 100). The emitter and/or receiver windows 120, 122 may be defined by the material of the rear cover 118 (e.g., they may be light-transmissive portions of the material of the rear cover 118), or they may be separate components that are positioned in holes formed in the rear cover 118. The emitter and receiver windows, and associated internal sensor components, may be used to determine biometric information of a user, such as heart rate, blood oxygen concentrations, and the like, as well as information such as a distance from the device to an object. The particular arrangement of windows in the rear cover 118 shown in FIG. 1B is one example arrangement, and other window arrangements (including different numbers, sizes, shapes, and/or positions of the windows) are also contemplated. As described herein, the window arrangement may be defined by or otherwise correspond to the arrangement of components in the integrated sensor package.

The rear cover 118 may also include one or more electrodes 124, 126. The electrodes 124, 126 may facilitate input to biometric sensing circuitry or other sensing circuitry within the device 100 (optionally in conjunction with the input feature 116). The electrodes 124, 126 may be a conductive surface that is conductively coupled, via one or more components of the device 100, to the biometric sensing circuitry.

Figure 2:
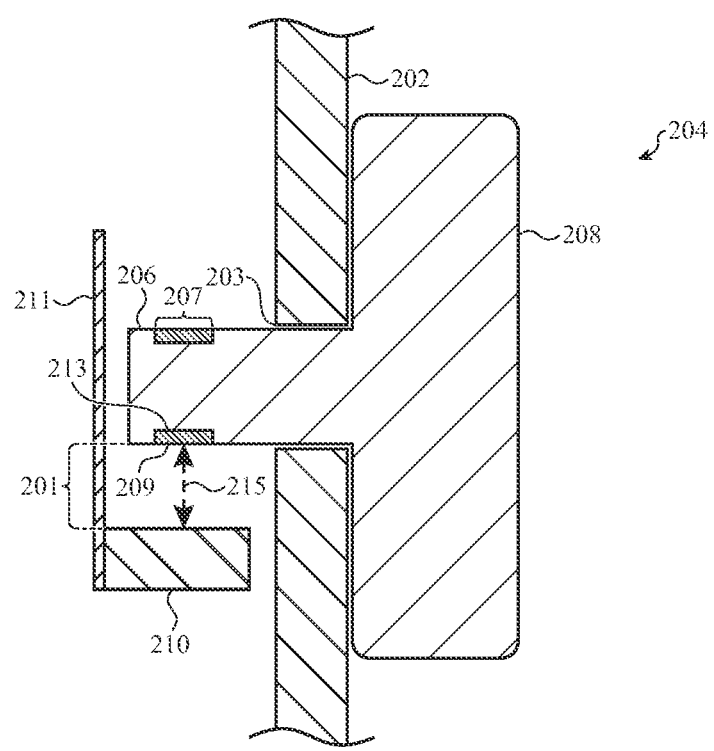
FIG. 2 depicts a schematic illustration of an example rotational sensing system.

FIG. 2 depicts a partial cross-sectional view of a portion of an electronic device having a crown and an optical sensing system for detecting a characteristic of the rotational input of the crown. The optical sensing system depicted in FIG. 2 may direct light (e.g., a laser beam, a flood of illumination, etc.) onto a rotating surface of the crown, and receive reflected portions of the emitted light to detect characteristics of the rotational input (e.g., speed and direction of rotation). More particularly, as described herein, the optical sensing system may direct light onto a reflective coating that is disposed on a rotating structure of the crown, and the reflective coating reflects a portion of the incident light back to the optical sensing system. As used herein, a reflective coating may be a coating that reflects at least a portion of the light that is incident thereon. Reflective coatings may have a higher reflectance than a material or component on which the coating is disposed. In some cases, a reflective coating may reflect a majority of light that is incident on the coating (e.g., greater than about 50% of incident light, greater than about 75% of incident light, greater than about 80% of incident light, greater than about 85% of incident light, or more).

As shown in FIG. 2, a device may include a housing with a side wall 202 having an opening 203 (e.g., a through-hole). A crown 204 may include a knob 208 that is external to the housing and configured to receive a rotational input, and a shaft assembly 206 that is coupled to the knob and extends through the opening 203 such that it is at least partially within the housing. The knob 208 and shaft assembly 206 may be a single unitary component, or they may include multiple components or pieces coupled together. In either case, a rotational input applied to the knob 208 causes the shaft assembly 206 (or at least a portion thereof) to rotate. The knob 208 may be a single unitary component (e.g., a single piece of metal), or it may include multiple components or pieces coupled together. The shaft assembly 206 may be a single unitary component (e.g., a single piece of metal), or it may include multiple components or pieces coupled together.

An optical sensing unit 210, which may be positioned on a substrate 211 (e.g., a circuit board or other suitable structure within a device), emits light (e.g., a laser beam or other light emission) that is ultimately directed onto a coating 207 (e.g., a reflective coating 207) of the shaft assembly 206. As shown in FIG. 2, the reflective coating 207 is on a cylindrical surface of a shaft assembly, though in other implementations a reflective coating may be on a different surface or structure (e.g., a surface of a disk).

The reflective coating 207 may be disposed in a recess 213 that is formed around a circumference of the shaft assembly 206 (e.g., along a circumferential surface of the shaft assembly 206). For example, a recess 213 may extend continuously about a circumference of the shaft assembly 206. The reflective coating 207, positioned in the recess 213, may therefore form a ring-like or cylindrical shape that is co-axial with the rotational axis of the shaft assembly 206.

The recess 213 may be configured (e.g., have a shape, size, and/or other characteristic) such that the reflective coating 207 forms a particular shape once it is positioned in the recess (and optionally cured, dried, and/or allowed to harden). For example, the recess 213 may have a uniform depth, such that the reflective coating 207 has a uniform thickness. The depth of the recess 213 and the thickness of the reflective coating 207 (which may be substantially identical) may be greater than about 20 microns, greater than about 50 microns, greater than about 60 microns, greater than about 65 microns, greater than about 75 microns, greater than about 80 microns, or another suitable size. In some cases, the depth may be between about 60 microns and about 100 microns, or between about 70 microns and about 90 microns.

The depth of the recess 213 may be uniform along multiple dimensions. For example, the depth of the recess may be uniform along the length of the shaft assembly 206 (e.g., left to right in FIG. 2), and it may be uniform along the circumference of the shaft assembly 206 (e.g., annularly). Moreover, the recess 213 may be co-axial with the rotational axis of the shaft assembly 206. Additionally, the recess 213 and the resulting reflective coating 207 (e.g., the reflective surface 209) may have a low eccentricity or other deviation from a circular path or shape (e.g., the recess 213 and the reflective surface 209 of the coating 207 may be substantially circular).

The uniformity of the depth and the co-axial alignment of the recess 213, as well as the low eccentricity (and/or low runout value), contribute to the accuracy and precision of the rotation sensing system, as well as providing other advantages for the device. For example, the uniform depth, co-axial alignment, and circularity result in the reflective coating 207 defining a reflective surface 209 (also referred to as an exterior surface) with little or minimal axial and/or radial runout. In some cases, a maximum cumulative deviation in the distance 201 between the reflective surface 209 and an optical sensing unit 210 over a full rotation of the crown 204 (which may correspond to a runout specification or tolerance) is less than about 100 microns. As used herein, a runout measurement, specification, or value may characterize multiple potential deviations in the dimensions of the recess 213, reflective coating 207, and/or reflective surface 209, including but not limited to eccentricity, axial alignment, depth uniformity, and circularity (e.g., the extent to which the surface follows a circular path or shape).

Variations in the distance 201 with the rotation of the crown 204 may negatively affect the accuracy and precision of the optical sensing system. For example, a change in the distance 201 while the crown is rotating at a constant speed (e.g., due to eccentricity of the reflective coating 207, waviness or other non-circularity of the surface 209, etc.) may cause the rotation sensing system to register a change in rotation speed. Such errors may negatively affect the operation of the device. For example, graphical outputs that are being manipulated in accordance with rotational speed of the crown may appear not to be accurately tracking the user's input, and may appear jittery or jumpy despite a constant rotational speed. Accordingly, the particular shape of the recess 213 and the reflective coating 207 (as well as other properties, such as material properties) may produce a reflective coating 207 having a dimensional uniformity that results in accurate and precise rotation measurements.

The particular shape and dimensions of the reflective coating 207 may also affect the reflectance of the reflective coating 207. For example, the reflectance of the reflective coating 207 may be a function of the coating thickness (e.g., a thinner coating may have lower reflectance than a thicker coating). Accordingly, deviations in the thickness of the reflective coating 207 may affect the operation of the rotation sensing system, such as by changing the signal-to-noise ratio of the signal as the crown is rotated, and/or otherwise introducing irregularities in the received light that may affect accuracy and/or precision of the sensing system. Accordingly, the uniform thickness of the reflective coating 207 may result in the reflective coating 207 having a uniform reflectance along its cylindrical outer surface.

As noted above, achieving a high degree of uniformity of the thickness of the reflective coating 207 and the distance between the reflective coating 207 and the optical sensing unit 210 along the circumference of the reflective coating 207 may contribute to the accuracy and/or precision of the rotation sensing system as the crown is rotated. Additionally, the uniformity of these parameters along an axial dimension may contribute to the accuracy and/or precision of the rotation sensing system, and may also provide other advantages as well. In particular, as noted above, the crown 204 may translate (e.g., along the rotational axis) as well as rotate about the rotational axis. In some cases, the crown may be rotated while it is being translated, and as such the accuracy and precision of the rotation sensing during translation may be affected by deviations in the thickness of the coating, the shape of the exterior surface (e.g., whether it is convex, concave, or flat in the cross-section shown in FIG. 2), and/or distance to an optical sensing unit (e.g., distance 201).

Furthermore, the location or area of incidence of light onto the reflective surface 209 may differ between devices due to manufacturing and assembly tolerances. Accordingly, by maintaining a high degree of dimensional uniformity (e.g., uniform depth, coaxial alignment, low runout, etc.) along the axial dimension (e.g., left to right in FIG. 2), a high degree of accuracy and precision may be achieved during translational movements of the crown and despite differences in the area or location of incidence of light on the reflective surface 209.

The surface of the reflective coating 207 may be substantially smooth. For example, in some cases, the reflective coating 207 (e.g., the outer, reflecting surface of the reflective coating 207) may have a surface roughness (e.g., Ra or RMS) between about 1 nanometer and about 125 nanometers. In some cases, the reflective coating 207 may have a surface texture. For example, in some cases, the reflective coating 207 (e.g., the outer, reflecting surface of the reflective coating 207) may have a surface roughness (e.g., Ra or RMS) between about 500 nanometers and about 1500 nanometers. The particular value of the surface roughness may be selected in order to achieve a target reflection characteristic. For example, a smoother surface may produce a more specular reflection, while a more textured surface may produce a more diffuse reflection.

As described above, an optical sensing system may use laser-based self-mixing interferometry to determine characteristics of rotational movements of a crown. For example, a laser-based system may use laser emitters, such as vertical-cavity surface-emitting lasers (VCSELs), to direct a laser beam (e.g., a beam of coherent light) onto a rotating surface of the crown (e.g., the reflective surface 209). The laser beams may be aimed at the rotating surface in such a way that some of the light from the laser beam is reflected by the reflective surface 209 of the reflective coating 207 and directed back into the laser emitter. The effect of the reflected light on the laser emitter may be used to determine the speed and direction of the rotation. More particularly, the laser beams may be aimed at the rotating surface such that the beam axis of the laser beam is incident on the surface at an oblique angle (e.g., the beam axis of the laser beam is not perpendicular to or parallel to the rotating surface at the area of incidence of the laser beam). In this configuration, the motion of the rotating surface affects the frequency of the reflected light. For example, if the rotating surface (e.g., a shaft) is rotating in one direction, the frequency of the reflected light may be higher than that of the incident light, and if the shaft is rotating in the opposite direction, the frequency of the reflected light may be lower than that of the incident light. Moreover, a greater rotational speed produces a greater shift in frequency of the reflected light. Thus, a higher speed of rotation will result in a larger frequency shift of the reflected light, as compared to a lower speed of rotation.

The difference in the frequency of the emitted light and the reflected light may have an effect on the laser emitter that can be used to detect the speed and direction of rotation of the crown. For example, when the reflected light is received by the laser emitter (while the laser emitter is also emitting light), the reflected light may cause a change in a frequency, amplitude, and/or other property(s) of the light being produced by the laser. These changes may be detected by the laser (and/or associated components and circuitry) and used to generate a signal that corresponds to a rotational motion of the crown. The signal may then be used to control functions of the device, such as to modify graphical outputs being displayed on the device.

Figure 3A:
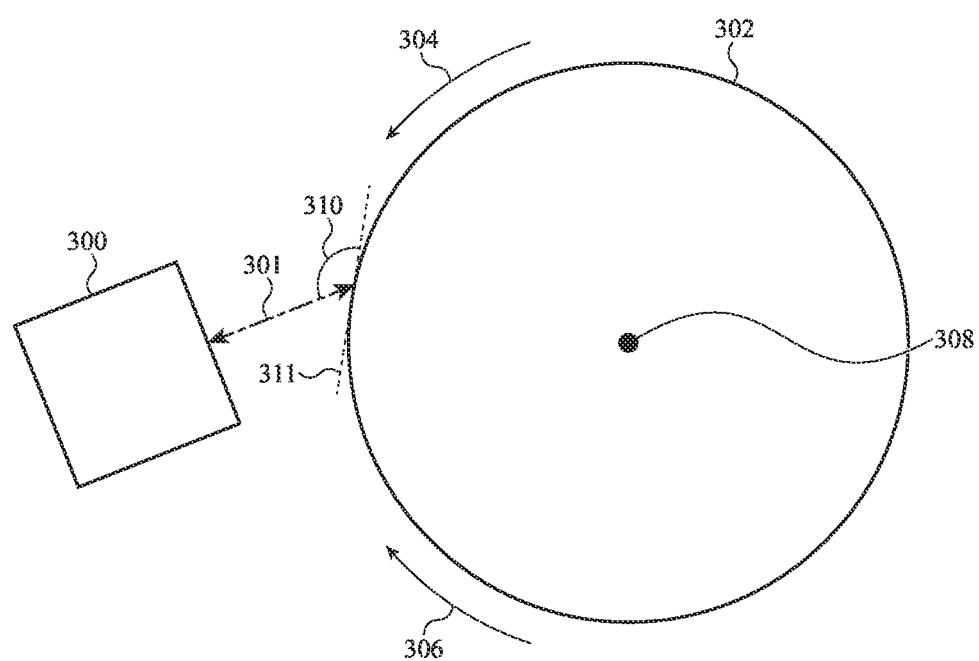
FIGS. 3A-3B depict schematic illustrations of example rotational sensing systems.

FIG. 3A illustrates an example of a rotation sensing system that may use a reflective coating and shaft assembly as described herein. In the example of FIG. 3A, the rotation sensing system may use laser-based self-mixing interferometry in which an incident beam (e.g., a laser beam) is incident on a surface of a shaft assembly (e.g., the reflective surface 209 of the reflective coating 207). As used herein, an incident beam refers to a segment or portion of a laser beam that is incident on a rotating surface of a shaft assembly. For example, FIG. 3A illustrates a laser component 300, from which the incident beam 301 propagates. The laser component 300 may be a beam-directing structure (e.g., an optical component configured to direct a laser beam along a particular path), a laser emitter, or any other component of an optical system that directs an incident beam onto a target surface of the shaft assembly (e.g., the reflective surface 209). The spot size of the incident beam on the reflective surface 209 may be between about 5 and about 20 microns. As shown, the incident beam 301 is incident on the reflective surface 302 (which may correspond to the reflective surface 209 in FIG. 2) at an oblique angle 310 (e.g., not perpendicular to or parallel to a tangent line or plane 311 at the area of incidence of the incident beam 301 on the surface 302). Stated another way, the path along which the incident beam 301 travels does not intersect a rotational axis 308 of the shaft assembly.

The oblique angle of the incident beam 301 on the surface 302 results in a phenomenon that is used by the rotation sensing system to determine the speed and direction of the rotation of the shaft assembly. In particular, a portion of the incident beam 301 is reflected from the surface 302 along the same path as the incident beam 301, and ultimately reaches the laser emitter that produced the laser beam. When the incident beam 301 is incident on the surface 302, the motion of the sensing surface causes the portion of the laser beam that is reflected back along the same path as the incident beam (referred to as the reflected portion) to have a different frequency than the incident beam. For example, if the surface 302 is rotating in a first direction 304, the frequency of the reflected portion of the beam may be higher than the frequency of the incident beam 301. If the surface 302 is rotating in a second direction 306 (e.g., opposite the first direction), the frequency of the reflected portion may be lower than the frequency of the incident beam 301. Moreover, as noted above, the speed of rotation (e.g., the rotational velocity) of the sensing surface may determine the extent to which the frequency is changed. Thus, higher rates of rotation correspond to greater shifts in the frequency as compared to the frequency of the incident beam.

Once the reflected portion of the beam reaches the laser emitter, the reflected light may cause a change in a frequency, amplitude, and/or other property(s) of the light being produced by the laser emitter, or may otherwise produce an effect in the resonator of the laser emitter. These changes and/or effects may be detected by the laser (and/or associated components and circuitry) and used to generate a signal that corresponds to a rotational motion of the crown. The signal may then be used to control functions of the device, such as to modify graphical outputs being displayed on the device.

Figure 3B:
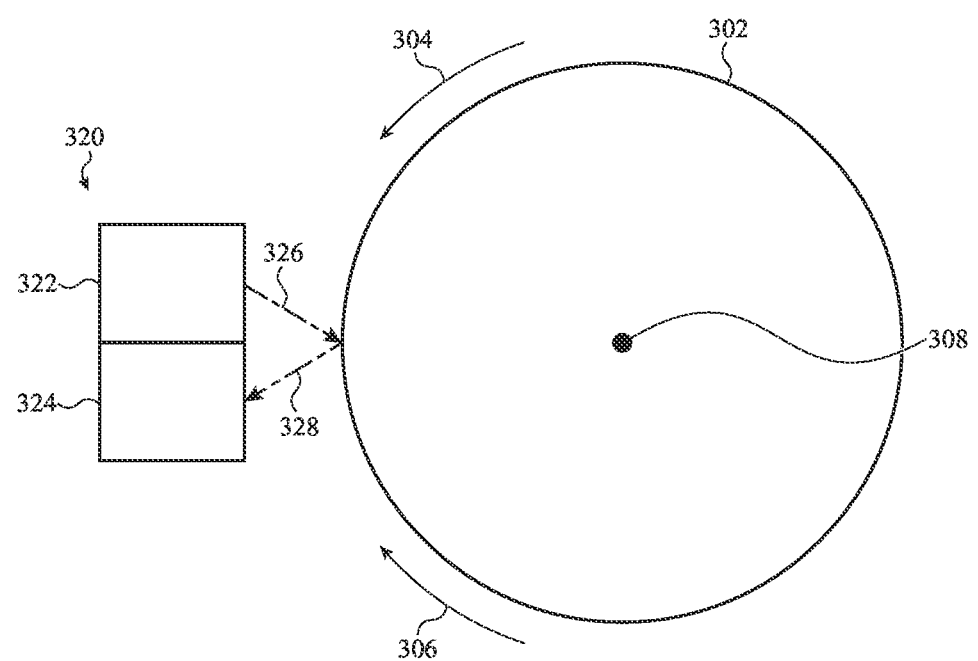

FIG. 3B illustrates another example rotation sensing system that may use a reflective coating and shaft assembly as described herein. While the rotation sensing system of FIG. 3A illustrates a laser component 300 that both emitted and received light along a same light path, FIG. 3B illustrates an example in which an optical unit 320 includes an emitter 322 that emits an incident beam 326 (which may be a laser beam or other light beam or illumination pattern or field) onto the reflective surface 302 (which may correspond to the reflective surface 209 in FIG. 2). The optical unit 320 also includes a receiver 324 that receives a portion of the light that is reflected by the reflective surface 302 (e.g., reflected beam 328). The receiver 324 may use properties of the received light to determine characteristics of the rotation, such as speed and direction of rotation of the crown. In some cases, the receiver 324 may capture images of the reflective surface 302 and analyze the images to determine rotational characteristics. In some cases, the reflective coating may include stripes of differing color, materials, or shapes that affect the reflected light in a manner that is used by the receiver 324 to determine rotational characteristics of the crown.

Figure 4:
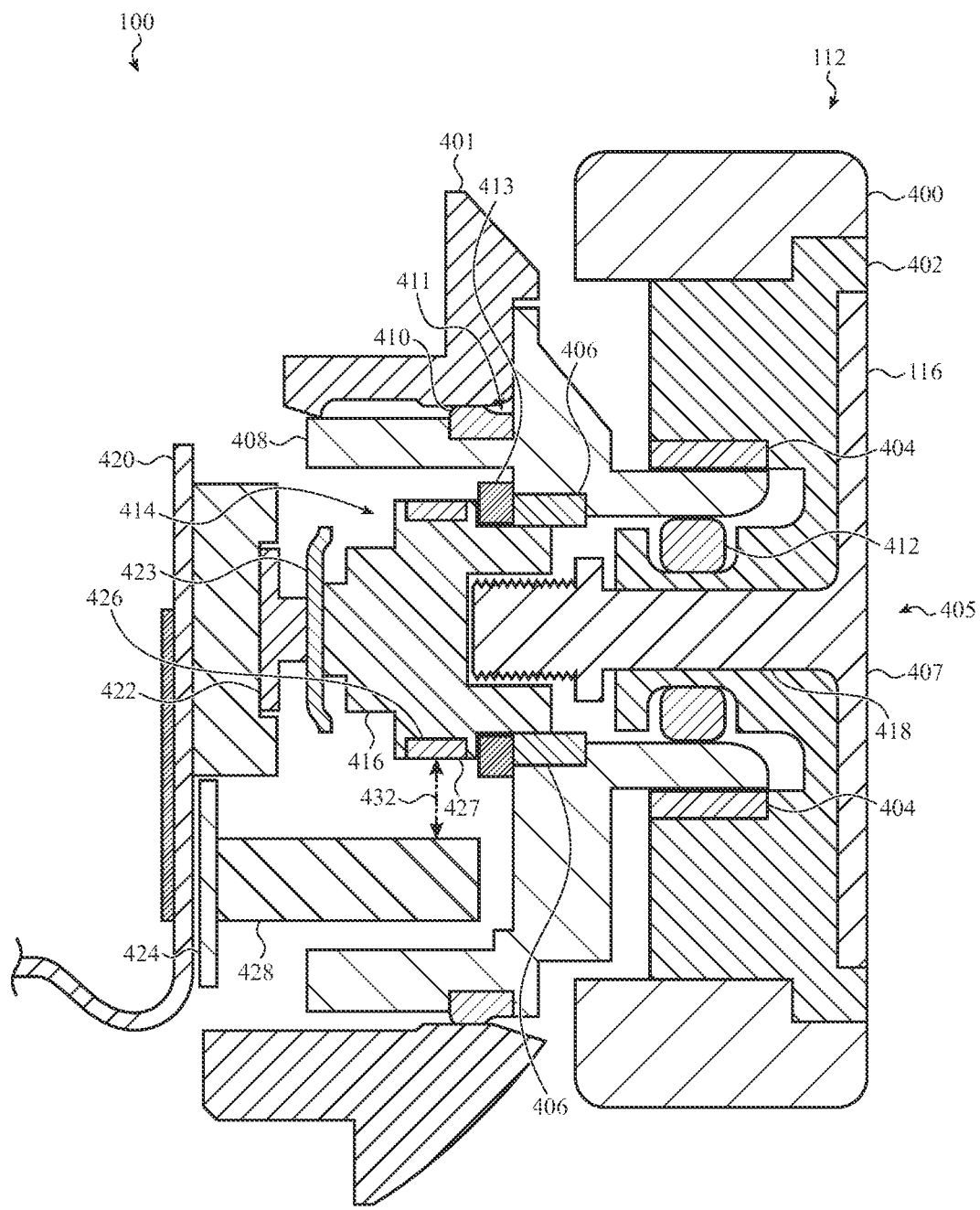
FIG. 4 depicts a partial cross-sectional view of an example input system for an electronic device.

FIG. 4 depicts a partial cross-sectional view of the device 100, viewed along line 4-4 in FIG. 1A, illustrating an example implementation of a crown and an optical sensing system as described herein. As shown, the device 100 includes a side wall 401, which is a side wall of the housing 102 (FIG. 1A). The side wall 401 has an opening 411 (e.g., through-hole) formed therethrough. A crown assembly 112, or a portion thereof (e.g., a shaft assembly), is positioned in the opening 411, and extends into an internal volume of the housing 102. As used herein, a crown assembly may refer to the component or components that rotate in response to a rotational user input.

A collar 408 may be positioned in the opening 411 and attached to the housing (e.g., via adhesives, clamps, fasteners, etc.), and a shaft assembly 414 of the crown assembly 112 may extend through a hole in the collar 408. The crown assembly 112 may be retained to the collar 408, and thereby retained to the housing 102. For example, the shaft assembly 414 may include a rotor 416 that is secured to the distal end of a shaft portion 418. The rotor 416 may define a shoulder or ledge that limits the outward movement of the crown. The shoulder may contact an internal portion of the housing or other stationary component during normal operation as a dome switch and/or a spring element may bias the crown outward. In some cases, the rotor 416 does not engage the housing or otherwise structurally retain the crown assembly 112 at a position or location. For example, in some cases, the rotor 416 may not physically contact any non-rotating structures or components. As described herein, the rotor 416 may define a recess 426 in which a reflective coating 427 is positioned.

A thrust bushing 413 (e.g., a bearing or bushing formed of or including a polymer, metal, or other suitable material) may be positioned between the rotor 416 and an interior surface of the collar 408 to provide a friction surface along which the rotor 416 may slide during rotation of the crown assembly 112. A seal 410 may be provided between the collar 408 and the side wall 401 to seal the interface between the collar 408 and the side wall 401.

The crown assembly 112 may include a knob 405 (which may also be referred to as a head or dial) that is external to the housing 102 and receives a rotational input. The knob 405 may comprise a ring member 400. The ring member may be formed from metal, polymer, and/or other suitable materials, and may include knurls, grooves, or other features to provide a desired tactile feel when grasped or otherwise contacted by a user (e.g., when providing a rotational input). The crown assembly 112 may also include a molded structure 402 that couples the ring member 400 to a cap assembly 407. The molded structure 402 may structurally couple the ring member 400 to the cap assembly 407, while also electrically isolating the cap assembly 407 from the ring member 400.

The crown assembly 112 may also include a shaft assembly 414 that is coupled to and/or extends from the knob and is positioned at least partially within the housing. The shaft assembly 414 (or a component of the shaft assembly, such as the rotor 416) may define a recess 426 that extends about a circumference of the shaft assembly 414, as described herein. The recess 426 may have a substantially uniform depth along both the circumference of the shaft assembly 414 and along the rotational axis of the shaft assembly 414, as described herein. For example, the depth of the recess (and thus the thickness of the reflective coating 427) may be greater than about 20 microns, greater than about 50 microns, greater than about 60 microns, greater than about 65 microns, greater than about 75 microns, greater than about 80 microns, or another suitable depth. In some cases, the depth may be between about 60 microns and about 100 microns, or between about 70 microns and about 90 microns.

A width of the recess 426 (e.g., the distance, along the axial direction, between opposite walls of the shaft) may be between about 0.5 mm and about 1.0 mm. The width of the recess 426 may be sized relative to the spot size of the incident light and the translation distance of the crown assembly 112 such that the light is incident on the reflective coating 427 that is within the recess along at least a portion (and optionally an entire) translational stroke of the crown assembly 112. In this way, rotation can be detected even while the crown assembly 112 is being translated.

The crown assembly 112 may also include a reflective coating 427 positioned in the recess 426. As described herein, the reflective coating 427 reflects at least a portion of incident light into a component of an optical sensing system (e.g., into the same laser emitter that emitted the incident light). In some cases, the surface has substantially uniform reflection properties (e.g., bidirectional reflectance distribution function) about its circumference, such that substantially the same proportion of the laser beam is reflected into the laser emitter regardless of the rotational position of the sensing surface.

The external or outer surface of the reflective coating 427 may be cylindrical, and may define a reflective surface (e.g., the reflective surface 209, FIG. 2) that reflects light that is ultimately received by an optical sensing system. The reflective coating 427 may have a substantially uniform thickness along both the circumference of the reflective coating 427, and along the rotational axis of the reflective coating 427 and/or shaft assembly 414 (e.g., the horizontal direction as depicted in FIG. 4). The thickness of the reflective coating 427 may be substantially equal to the depth of the recess. In some cases, the reflective surface of the reflective coating 427 is substantially flush with the adjacent portions of the exterior surface of the shaft assembly 414 in which the recess is defined.

The reflective coating 427 may include a pigment and a binder material. In some cases, the pigment includes titanium dioxide. The titanium dioxide may be rutile or anatase titanium dioxide, and may have particle sizes having a particle size between about 50 and about 650 nanometers. The binder material, or simply binder, may be a polymer such as a polyurethane acrylate, acrylic, or another suitable binder. The reflective coating 427 may be white.

The rotor 416 may be attached to the shaft portion 418, such as via a threaded connection. For example, an end of the shaft portion 418 (which may also be part of the shaft assembly 414) may define a threaded hole, and the rotor 416 may be threaded into the threaded hole. In other cases, the rotor 416 may be attached in a different manner (e.g., via adhesive, etc.).

As noted above, characteristics of a rotation of the crown assembly 112 may be detected by directing light, such as a laser beam, onto the reflective coating 427 of the crown assembly 112, and receiving or otherwise detecting a reflected portion of the laser beam. FIG. 4 illustrates an optical sensing unit 428 sending and emitting light onto and receiving reflected light from the reflective coating 427. As described herein, the optical sensing unit 428 may be a laser module that emits a laser beam and receives a reflected portion of the laser beam along a common light path. In other examples, the optical sensing unit 428 may include a separate emitter and receiver. As shown in FIG. 4, the optical sensing unit 428 is attached to a substrate 424, such as a circuit board. The substrate 424 may be coupled to a circuit element 420, such as a flexible circuit element, which includes conductors that conductively couple the optical sensing unit 428 and/or other electrical components on the substrate 424 (e.g., via conductors in or on the substrate 424) to other circuitry and/or electronic components in the device (e.g., processors, memory, etc.).

The reflective coating 427 reflects at least a portion of the light (e.g., a laser beam) back into the optical sensing unit 428. Due at least in part to the angle at which the laser beam is incident on the reflective coating 427 (e.g., not perpendicular to the reflective coating 427 at the point where the light is incident on the sensing surface), if the crown assembly 112 is rotating when the laser beam is incident, the reflected portion of the light may have a different frequency than the emitted laser beam. The different frequency of the reflected laser beam may affect the operation of the optical sensing unit 428 in a manner that can be used to determine the speed and/or direction of rotation of the crown assembly 112, as described herein.

As noted above, the crown of a device may include or define an input feature 116 that can be used to facilitate biometric sensing functions. For example, the cap assembly 407 and rotor 416 may define a conductive path between the input feature 116 and a biometric sensor of the device, such as an ECG sensor. The cap assembly 407 may be formed of a conductive material (e.g., a metal) and may define an input feature 116 (e.g., a disk-like feature) on the axial end surface of the crown assembly 112, as well as the shaft portion 418. Further, the rotor 416 may also be formed of a conductive material (e.g., metal). Accordingly, a user can touch a finger or other body part to the input feature 116, and the biometric sensor can detect electrical characteristics of the user's body through the cap assembly 407 (and optionally the rotor 416).

The crown assembly 112 may be supported by guide members 404 and 406. The guide members 404, 406 may be bushings, bearings, or the like. The guide member 404 may be attached to the crown assembly 112 (e.g., attached to the molded member 402 or another component or portion of the crown assembly 112), or it may be attached to the collar 408. Similarly, the guide member 406 may be attached to the crown assembly 112 (e.g., attached to the shaft assembly 414), or it may be attached to the collar 408. In some cases, the guide member 404 is attached to the crown assembly 112, while the guide member 406 is attached to the collar 408. The crown assembly 112 and/or the collar 408 may slide along a surface of the guide members 404, 406 when the crown assembly 112 is rotated. In some cases, the guide members 404, 406 include one or more coatings to reduce friction and/or provide a target coefficient of friction between them and their respective contact surfaces, thereby providing a desired resistance to rotation and/or tactile feel when rotated by a user.

A seal 410 (e.g. a first seal) may be positioned between the collar 408 and the housing (e.g., the side wall 401) to inhibit ingress of water, liquids, or other contaminants into the device. The seal 410 may be an elastomeric or other compliant or compressible material and may be compressed or otherwise deformed to form intimate contact with the surfaces of the housing and the collar 408. A seal 412 (e.g., a second seal) may be positioned between the crown assembly 112 and the collar 408 to inhibit ingress of water, liquids, or other contaminants into the device. The seal 412 may be an elastomeric or other compliant or compressible material and may be compressed or otherwise deformed to form intimate contact with the surfaces of the crown assembly 112 and the collar 408. In some cases, the seal 412 is or resembles an O-ring. One or more of the surfaces in contact with the seal 412 may slide along a surface of the seal 412 to maintain the seal during rotation and/or translation of the crown assembly 112.

As noted above, the crown assembly 112 may be translatable along its axis (e.g., in response to an input force applied to the axial end of the crown assembly 112) to provide an input to the device. In order to detect the axial input, the device 100 may include a switch 422 (e.g., a dome switch) that is configured to be actuated by an end of the crown assembly 112. The switch 422 may be attached to a substrate, such as a circuit board. The switch 422 may be a dome switch, which may provide electrical switching functionality (e.g., closing a circuit upon actuation by the crown assembly 112) as well as a tactile output that may be felt or otherwise perceived by the user. For example, the user may feel a click, detent, or other sensation upon the collapse of the dome switch, thus indicating to the user that an input has been successfully provided to the device 100. In some cases, other types of switches or force sensing components may be used to detect axial inputs, which may be positioned similarly to the switch 422 in FIG. 4. As noted above, the reflective coating 427 and the optical sensing unit 428 may be configured so that the light 432 is incident on the reflective coating 427 and reflected onto the optical sensing unit 428 along at least a portion of the translational stroke of the crown assembly 112, such that rotation can be sensed even during at least a portion of a translational input.

In some cases, a friction guard 423 (or shear plate or wear plate), or a portion thereof, is positioned between the switch 422 and the rotor 416 (or between the switch 422 and a different portion of the crown assembly 112, in cases where a rotor 416 is not used). Axial forces from the crown assembly 112 may be transferred to the switch 422 through the friction guard 423. Because the friction guard 423 does not rotate, any friction due to rotation of the crown assembly 112 is applied to the friction guard 423 and not to the switch 422. This may help extend the life of the switch 422 by preventing the friction from damaging the outer surface of the switch 422, for example.

Figure 5:
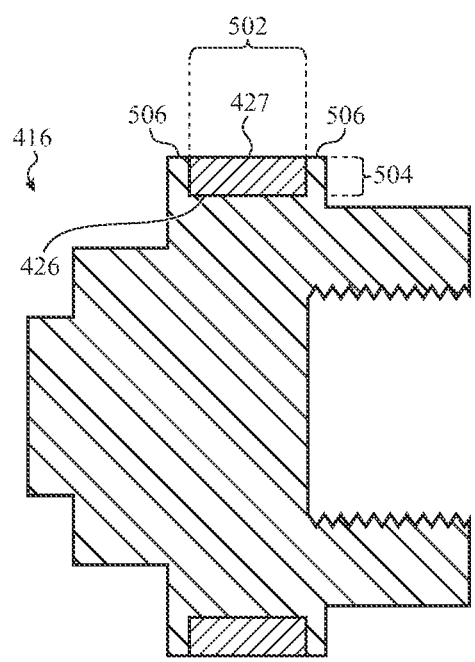
FIG. 5 depicts a partial cross-sectional view of the example input system of FIG. 4.

FIG. 5 is a cross-sectional view of the rotor 416. As described herein, the particular shape and dimensions of the recess 426 may be configured so that the reflective coating 427 positioned therein forms a substantially uniform thickness along both its axial dimension (e.g., horizontal in FIG. 5) and along its circumference. Furthermore, the depth of the recess 426 may be selected to provide a target reflectance (e.g., greater than about 60% reflectance, greater than about 70% reflectance, greater than about 85% reflectance, or the like). For example, the depth 504 of the recess may be greater than about 20 microns, greater than about 50 microns, greater than about 60 microns, greater than about 65 microns, greater than about 75 microns, greater than about 80 microns, or another suitable depth. In some cases, the depth 504 may be between about 60 microns and about 100 microns, or between about 70 microns and about 90 microns.

The width 502 of the recess 426 may be configured so that rotational sensing can be performed during at least a portion of translational movements of the crown assembly (and/or to accommodate manufacturing and assembly tolerances that may affect the alignment between the reflective coating 427 and an optical unit). In some cases, the crown assembly is configured to translate about 0.5 mm, and the width 502 of the recess 426 is equal to or greater than about 0.5 mm. In some cases, the width of the recess 426 is about 0.6 mm.

While the width 502 and depth 504 dimensions are described as referring to the recess 426, it will be understood that the reflective coating 427 may have the same dimensions. For example, the reflective coating 427, when in its cured, dried, hardened, and/or final state, may fill the recess 426 and the exterior or outer surface of the reflective coating 427 (e.g., the reflective surface 209, FIG. 2) may be substantially flush or level with the adjacent portion 506 of the exterior surface of the rotor 416 (or whichever portion of the crown assembly defines the recess).

The recess 426 may be defined by various features and/or configurations of a shaft, rotor, or other rotating component. For example, the recess 426 may be formed by machining the recess into a surface of the rotating component. In the case of a cylindrical shaft, for example, the recess 426 may be recessed relative to the cylindrical shaft surface (which may otherwise be substantially cylindrical and featureless). In some cases, the recess 426 may be defined by raised flanges, fins, or walls that extend from an otherwise cylindrical shaft surface. Regardless of the shape and/or configuration of the component in which the recess is defined, the recess may define or include a bottom surface and opposing side surfaces that contain a coating material (e.g., a paint) within the recess.

Figure 6A:
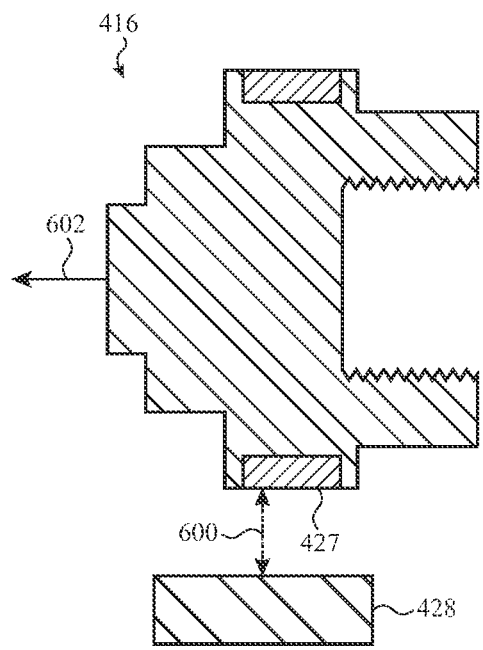
FIGS. 6A-6B depict partial cross-sectional views of the example input system of FIG. 4.
Figure 6B:
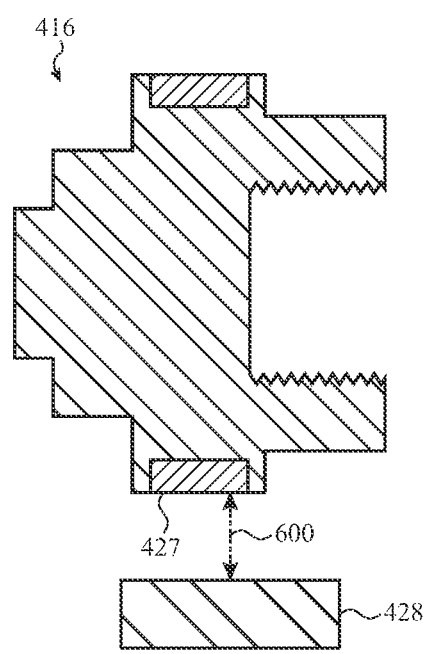

FIGS. 6A-6B depict the rotor 416 and the optical sensing unit 428, illustrating how the reflective coating 427 is dimensioned to accommodate rotation sensing during translation of the crown. In particular, as shown in FIG. 6A, when the crown is in an undepressed or resting position, light 600 is incident on and/or reflected from a first location on the surface of the reflective coating 427. FIG. 6B depicts the rotor 416 in a depressed or translated position (e.g., translated along direction 602 in FIG. 6A). In this position, the light 600 is incident on and/or reflected from a second location on the surface of the reflective coating 427. Because the light is incident on and/or reflected from the surface of the reflective coating 427 in both the depressed and undepressed positions, rotation sensing can be uninterrupted even during crown translation inputs. FIGS. 6A-6B may also illustrate the crowns of two different devices, showing how even differences in component positioning and/or alignment may be accommodated by the dimensions of the reflective coating 427 (e.g., the width dimension).

The reflective coating may be defined at least in part by the shape of the recess. In particular, the coating may be applied to the recess in a liquid or flowable state, and then allowed to cure or otherwise harden or dry in place. Thus, the coating material may flow to match the shape of the recess that the coating material contacts. Accordingly, the particular shape of the recess may be shaped in order to produce a reflective coating having a target shape. FIGS. 7A-7E illustrate various example recess configurations that may be used to form a reflective coating having a target shape.

Figure 7A:
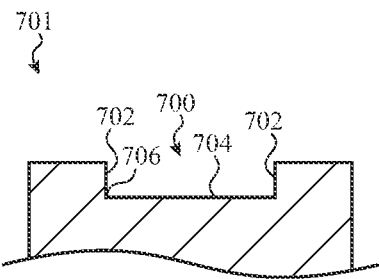
FIGS. 7A-7E depict partial cross-sectional views of the example input system of FIG. 4, showing various configurations of recesses for receiving coatings.

FIG. 7A illustrates a portion of an example shaft assembly 701 (e.g., the rotor 416) with an example recess 700. The recess 700 is defined by a bottom surface 704 and side surfaces 702 (e.g., a first side surface and a second side surface opposite the first side surface). The side surfaces 702 meet the bottom surface 704 at substantially right angles, forming distinct, non-rounded corners 706. For example, the corners 706 may have substantially no radius of curvature, or only a nominal radius of curvature.

Figure 7B:
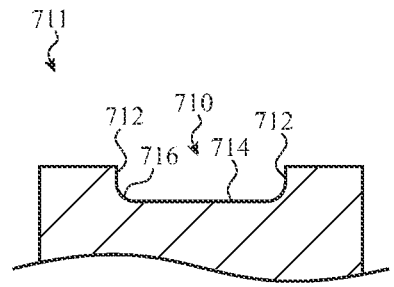

FIG. 7B illustrates a portion of an example shaft assembly 711 (e.g., the rotor 416) with an example recess 710. The recess 710 is defined by a bottom surface 714 and side surfaces 712 (e.g., a first side surface and a second side surface opposite the first side surface). The side surfaces 712 meet the bottom surface 714 at rounded corners 716, such as having a radius of curvature between about 5 microns and about 20 microns. The flat portions of the side surfaces 712 may be substantially perpendicular to the bottom surface 714.

Figure 7C:
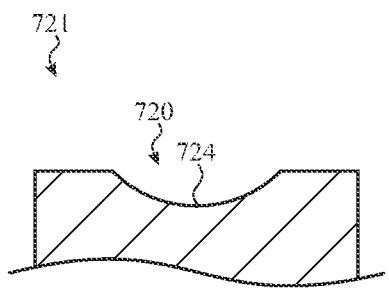

FIG. 7C illustrates a portion of an example shaft assembly 721 (e.g., the rotor 416) with an example recess 720. The recess 720 has a continuously curved bottom surface 724. The particular shape of the curve (e.g., the radius or radii of curvature, the depth, etc.) may be configured so that the reflective coating deposited in the recess 720 forms a target shape, thickness, surface shape, and the like. For example, the material of the reflective coating may define a curved exterior surface (e.g., a concave or convex meniscus, when viewed in cross-section as shown in FIG. 7C) when it is deposited into the recess 720. Accordingly, the shape of the curved recess 720 may be selected in conjunction with the particular material of the reflective coating and how that material behaves when deposited in the recess 720.

Figure 7D:
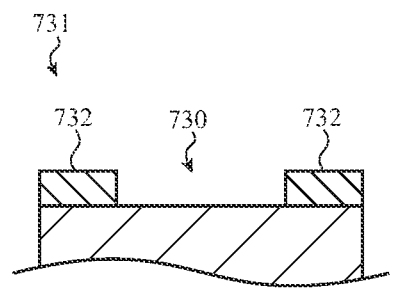
Figure 7E:
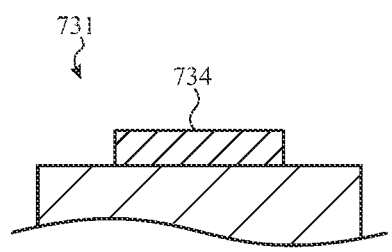

In the foregoing examples, the reflective coating is positioned in a recess that is formed in a shaft or component of a shaft assembly. In some cases, a recess may be defined by a removable or sacrificial structure that is removed subsequent to the formation and/or application of the reflective coating. FIGS. 7D-7E illustrate a portion of an example shaft assembly 731 (e.g., the rotor 416) at different stages of the formation of a reflective coating. FIG. 7D illustrates the shaft assembly 731 with removable barriers 732 coupled to the surface of the shaft assembly 731 and defining a recess 730. The removable barriers 732 may be a tape, paint, adhesive, film, polymer, epoxy, or other material that is applied to the shaft assembly 731 and defines a recess 730 having target dimensions. After applying or otherwise forming the removable barriers 732, a reflective material for a reflective coating is deposited in the recess 730. After the material is deposited in the recess 730 (and optionally after partially or fully cures or otherwise hardens), the removable barriers 732 are removed. FIG. 7E illustrates the shaft assembly 731 after the removable barriers 732 are removed, showing the shaft assembly 731 with the reflective coating 734 positioned thereon (and not positioned in a recess). The shape of the reflective coating 734 corresponds to and/or is defined by the shape of the recess 730, and may have the same or similar dimensions as those described herein with respect to reflective coatings that remain positioned in a recess.

Figure 8:
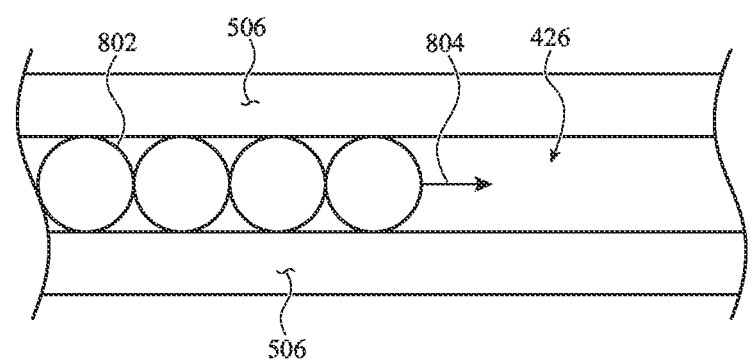
FIG. 8 depicts a material deposition process for coating a component of an input system.

The reflective coatings described herein may be formed at least in part using a deposition process in which a liquid or flowable material (e.g., a paint) is deposited in a recess of a shaft assembly or other rotating crown component. FIG. 8 illustrates an example deposition process that may be used to apply a paint or other material to form the reflective coatings described herein. In particular, FIG. 8 illustrates a top view of a portion of the rotor 416 that includes the recess 426 formed along the exterior surface 506 of the rotor. The material is dispensed from a dispensing nozzle into the recess 426 in droplet form. The material is shown in FIG. 8 as a series of droplets 802, though this is merely for illustration purposes, and the material and/or the droplets may not form the particular shapes, positions, sizes, etc., illustrated in FIG. 8.

The rotor 416 (and/or the nozzle) may be rotated during the material deposition process such that the material is deposited along the length of the recess 426, as indicated by arrow 804. In some cases, the rotor 416 may be rotated a single revolution while the material is being deposited, and the material may be deposited such that the last droplets do not overlap the first droplets, which may aid in producing a reflective coating having a uniform thickness. In other examples, the rotor 416 is rotated multiple times, and the material is deposited in multiple layers. As the material is deposited in a liquid or flowable form, the droplets may flow within the recess 426 to form a continuous layer or volume of material within the recess 426.

Various parameters, such as material volume deposition rate, droplet frequency, rotation speed (of the rotor 416 and/or the nozzle), and the like, may be selected so that a target volume of material is deposited in the recess 426. Accordingly, when the material is cured or otherwise hardened, the resulting reflective coating may have the target dimensions, such as the example dimensions described herein.

Figure 9A:
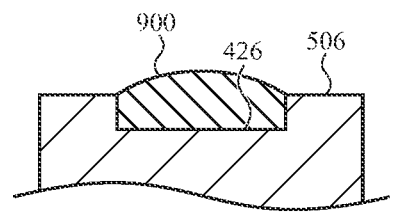
FIGS. 9A-9C depict stages of a coating operation for an input system.
Figure 9B:
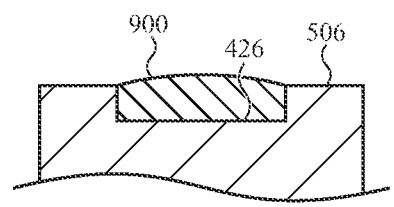
Figure 9C:
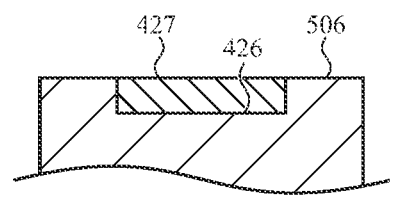

As described herein, FIGS. 9A-9C illustrate partial cross-sectional views of the rotor 416 (or any other shaft or component of a shaft assembly that includes a recess and a reflective coating) at various stages after a reflective material 900 for forming the reflective coating is deposited into the recess. FIG. 9A illustrates the rotor 416 after the material 900 is deposited into the recess 426. As described herein, the material 900 may be a liquid or other flowable material that includes one or more pigments, one or more binders, and optionally one or more liquid solvents. The pigment may be titanium dioxide (e.g., rutile or anatase titanium dioxide), antimony oxide, zinc oxide, or another suitable pigment, or a combination thereof. The binder may be a polymer such as an acrylic, latex, polyester, polyurethane, epoxy, or another suitable binder, or a combination thereof. The liquid solvent may be water, one or more organic solvents, or another suitable solvent, or a combination thereof.

In cases where the material 900 includes water and/or solvents that evaporate or are otherwise absent from the coating when cured, hardened, or otherwise in its final state, the recess 426 may be overfilled, as shown in FIG. 9A (e.g., where the top or exterior surface of the material 900 extends above the surfaces 506 of the rotor 416 that are adjacent the recess 426). As noted above, the volume of the material 900 deposited in the recess 426 may be selected such that the coating, in its final state, has the target dimensions. Accordingly, the recess 426 may be overfilled with the material 900 to account for the extra volume attributable to the solvents. In some cases, the curing or hardening process may also change the volume of the material 900 apart from evaporation of liquids. Such changes in the material volume during curing or hardening may be accounted for in the initial deposition process so that the resulting coating 427 (FIG. 9C) has the target dimensions.

FIG. 9B depicts the rotor 416 after the material 900 has undergone a partial cure or hardening (e.g., corresponding to some of the liquid solvents evaporating or being removed, and optionally binders or other components of the material 900 at least partially polymerizing). In some cases, after the material 900 is deposited (FIG. 9A), the rotor 416 is allowed to partially cure or harden in an ambient environment (e.g., between about 70 degrees Fahrenheit and about 80 degrees Fahrenheit) for a first duration (e.g., between about 5 minutes and about 100 minutes). FIG. 9B may represent the rotor 416 after this partial cure or hardening has occurred. As shown, the volume of the material 900 has reduced as compared to FIG. 9A, but it has not yet reached a final shape (e.g., it still defines a convex exterior shape and does not have a substantially uniform thickness).

FIG. 9C depicts the rotor 416 after the material 900 has undergone a full cure or hardening (e.g., corresponding to all or substantially all of the liquid solvents evaporating or being removed, and optionally any binders polymerizing), such that the material 900 has formed the reflective coating 427. In some cases, after the material 900 is at least partially cures or hardens (FIG. 9B), the rotor 416 is subjected to a heating process to fully cure or harden the material 900. For example, the rotor 416 may be heated at an elevated temperature (e.g., an oven having a temperature between about 150 degrees Fahrenheit and about 400 degrees Fahrenheit), for a duration (e.g., between about 1 hour and about 3 hours). The particular time and temperature of the heating operation may be selected at least in part on the particular parameters and components of the material 900 (e.g., the type of binder(s), solvent(s), etc.), the amount of the material 900, and the like.

The rotor 416 may optionally be rotated after the material 900 is deposited in the recess in order to inhibit drooping or flowing of the material 900 prior to curing, hardening, and/or drying, and/or to ensure a regular thickness and shape, such that the material 900 will cure, harden, and/or dry in the target, uniform shape and dimensions. Whether a rotor 416 is rotated may depend at least in part on properties of the material 900 and/or the rotor, including but not limited to viscosity, surface tension, surface energy, etc.

The material 900 may be thermally curable, irradiation (e.g., ultraviolet) curable, or both thermally and irradiation curable. In such cases, the material 900 may undergo a curing reaction, such as a polymerization reaction. In some cases, the material 900 does not undergo a curing reaction. In some cases, the material 900 may harden or dry via elimination and/or evaporation of water and/or solvents. The application and the curing, hardening, and/or drying processes may be adapted for the particular type of material used, including the particular type of solvents and/or binders used. For example, in cases where a UV curable material 900 material is used, the material 900 may be irradiated with UV radiation after the material is deposited (FIG. 9A) in order to cure the material 900 (FIGS. 9B-9C). As another example, in cases where a non-curing material 900 is used, the material 900 may be allowed to dry (in ambient conditions, in an oven, or the like) after the material is deposited (FIG. 9A) in order to allow the material to dry and/or harden (FIGS. 9B-9C). The structural and reflective properties of the reflective coating described herein may be achieved with various types of materials that cure, harden, and/or dry, or are otherwise applied to and/or deposited on a rotor.

Figure 10:
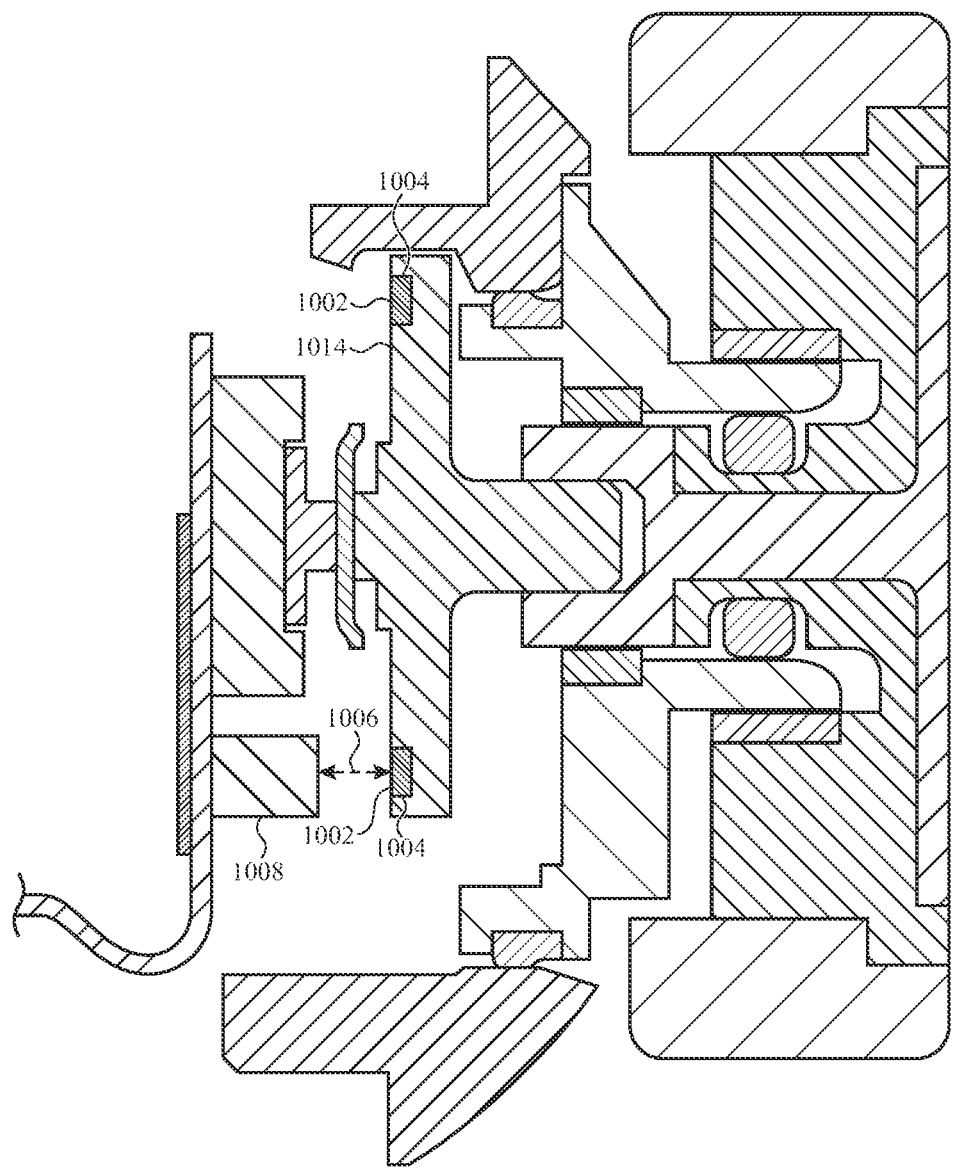
FIG. 10 depicts a partial cross-sectional view of another example input system for an electronic device.

The foregoing examples illustrate reflective coatings positioned on a cylindrical surface of a rotating portion of a crown. However, this is merely one example mechanism in which the reflective coating described herein may be used. FIG. 10 depicts a partial cross-sectional view of another example implementation of a crown and an optical sensing system, in which the shaft assembly includes a disk member that defines a planar surface or structure on which the reflective coating is disposed. The following description focuses on the differences between the implementations shown in FIGS. 4 and 10, though it will be recognized that many of the components in FIG. 10 are the same as corresponding components in FIG. 4, and for brevity those details are not repeated here. It will be understood that the same descriptions from FIG. 4 apply equally and/or by analogy to the corresponding components in FIG. 10.

As shown in FIG. 10, a crown assembly may include a disk member 1014. The disk member 1014 may be part of a shaft assembly of a crown assembly, similar to the rotor 416 described above. In some cases, the disk member 1014 is coupled to a shaft portion of a cap assembly (as shown). In some cases, a disk member or disk-like sensing surface is defined by a unitary cap assembly (e.g., the disk is part of the same monolithic piece of material as the rest of the cap assembly). A disk member or disk surface may be integrated with a crown in other ways as well.

The disk member 1014 (or any other suitable structure) defines a recess 1004, which may be similar to the recess 426 in FIG. 4, except that instead of being formed along a cylindrical surface, it is formed along a planar surface of the disk member 1014. A reflective coating 1002 may be positioned in the recess 1004. The reflective coating 1002 may be formed using the same materials and techniques as the reflective coating 427, and may have similar dimensions and properties. For example, the reflective coating 1002 may have a uniform thickness and a uniform reflectance along its exterior surface.

The optical sensing system in FIG. 10 may include an optical sensing unit 1008 that receives light 1006 reflected by the reflective coating 1002. For example, the optical sensing unit 1008 (e.g., a VCSEL) may direct a laser beam onto the reflective coating 1002, and may receive a reflected portion of the laser beam. The optical sensing system may use the received reflected light to determine one or more characteristics of the rotation of the disk member 1014.

Figure 11:
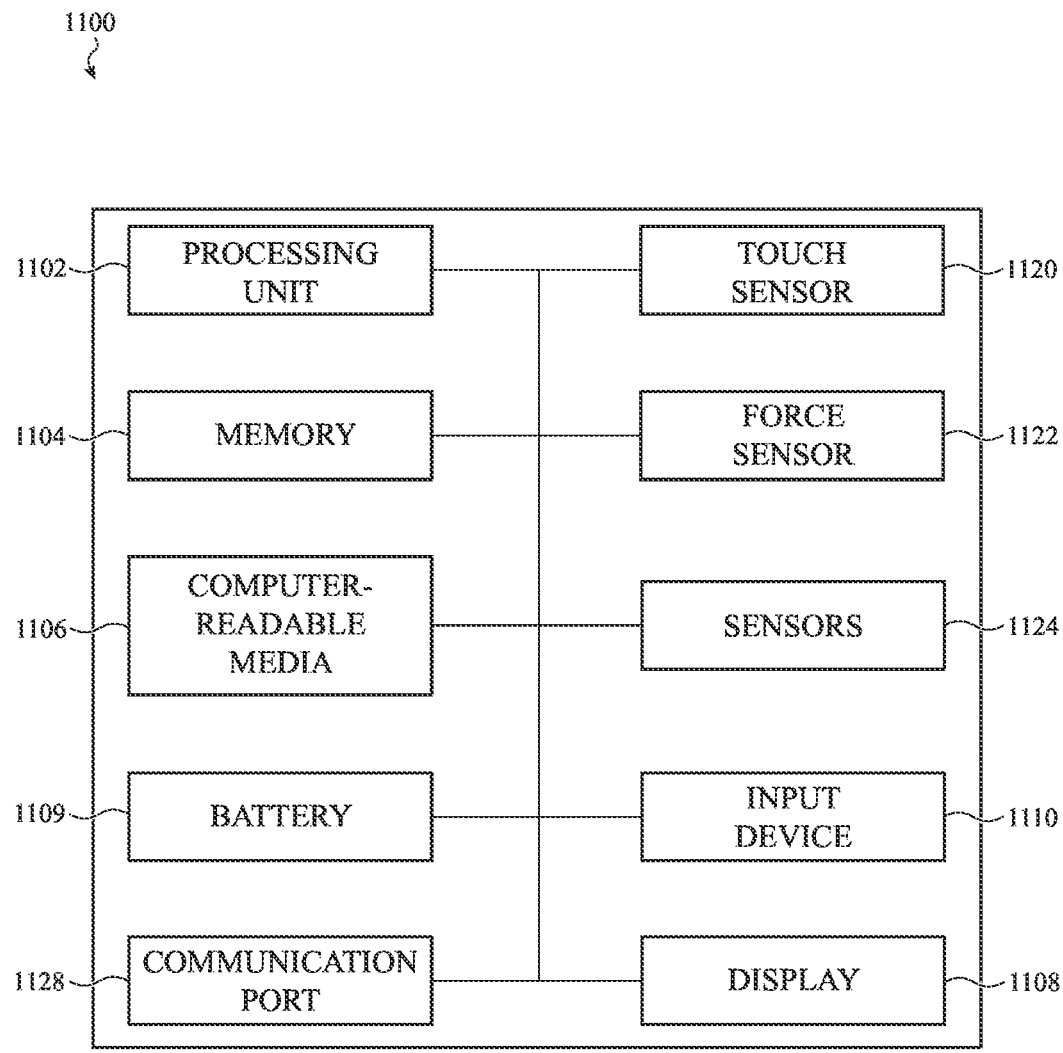
FIG. 11 depicts example components of a wearable electronic device.

FIG. 11 depicts an example schematic diagram of an electronic device 1100. By way of example, the device 1100 of FIG. 11 may correspond to the wearable electronic device 100 shown in FIGS. 1A-1B (or any other wearable electronic device described herein). To the extent that multiple functionalities, operations, and structures are disclosed as being part of, incorporated into, or performed by the device 1100, it should be understood that various embodiments may omit any or all such described functionalities, operations, and structures. Thus, different embodiments of the device 1100 may have some, none, or all of the various capabilities, apparatuses, physical features, modes, and operating parameters discussed herein.

As shown in FIG. 11, a device 1100 includes a processing unit 1102 operatively connected to computer memory 1104 and/or computer-readable media 1106. The processing unit 1102 may be operatively connected to the memory 1104 and computer-readable media 1106 components via an electronic bus or bridge. The processing unit 1102 may include one or more computer processors or microcontrollers that are configured to perform operations in response to computer-readable instructions. The processing unit 1102 may include the central processing unit (CPU) of the device. Additionally or alternatively, the processing unit 1102 may include other processors within the device including application specific integrated chips (ASIC) and other microcontroller devices.

The memory 1104 may include a variety of types of non-transitory computer-readable storage media, including, for example, read access memory (RAM), read-only memory (ROM), erasable programmable memory (e.g., EPROM and EEPROM), or flash memory. The memory 1104 is configured to store computer-readable instructions, sensor values, and other persistent software elements. Computer-readable media 1106 also includes a variety of types of non-transitory computer-readable storage media including, for example, a hard-drive storage device, a solid-state storage device, a portable magnetic storage device, or other similar device. The computer-readable media 1106 may also be configured to store computer-readable instructions, sensor values, and other persistent software elements.

In this example, the processing unit 1102 is operable to read computer-readable instructions stored on the memory 1104 and/or computer-readable media 1106. The computer-readable instructions may adapt the processing unit 1102 to perform the operations or functions described herein. In particular, the processing unit 1102, the memory 1104, and/or the computer-readable media 1106 may be configured to cooperate with a sensor 1124 (e.g., a rotation sensor that senses rotation of a crown component) to control the operation of a device in response to an input applied to a crown of a device (e.g., the crown assembly 112). The computer-readable instructions may be provided as a computer-program product, software application, or the like.

As shown in FIG. 11, the device 1100 also includes a display 1108. The display 1108 may include a liquid-crystal display (LCD), organic light emitting diode (OLED) display, light emitting diode (LED) display, or the like. If the display 1108 is an LCD, the display 1108 may also include a backlight component that can be controlled to provide variable levels of display brightness. If the display 1108 is an OLED or LED type display, the brightness of the display 1108 may be controlled by modifying the electrical signals that are provided to display elements. The display 1108 may correspond to any of the displays shown or described herein.

The device 1100 may also include a battery 1109 that is configured to provide electrical power to the components of the device 1100. The battery 1109 may include one or more power storage cells that are linked together to provide an internal supply of electrical power. The battery 1109 may be operatively coupled to power management circuitry that is configured to provide appropriate voltage and power levels for individual components or groups of components within the device 1100. The battery 1109, via power management circuitry, may be configured to receive power from an external source, such as an AC power outlet. The battery 1109 may store received power so that the device 1100 may operate without connection to an external power source for an extended period of time, which may range from several hours to several days.

In some embodiments, the device 1100 includes one or more input devices 1110. An input device 1110 is a device that is configured to receive user input. The one or more input devices 1110 may include, for example, a crown input system, a push button, a touch-activated button, a keyboard, a keypad, or the like (including any combination of these or other components). In some embodiments, the input device 1110 may provide a dedicated or primary function, including, for example, a power button, volume buttons, home buttons, scroll wheels, and camera buttons.

The device 1100 may also include a sensor 1124. The sensor 1124 may detect inputs provided by a user to a crown of the device (e.g., the crown assembly 112). The sensor 1124 may include sensing circuitry and other sensing components that facilitate sensing of rotational motion of a crown, as well as sensing circuitry and other sensing components (optionally including a switch) that facilitate sensing of axial motion of the crown. The sensor 1124 may include components such as an optical sensing unit (e.g., the optical sensing units 210, 428, 1008), a reflective coating (e.g., the reflective coatings 207, 427, 1002), a tactile or dome switch, or any other suitable components or sensors that may be used to provide the sensing functions described herein. The sensor 1124 may also be a biometric sensor, such as a heart rate sensor, electrocardiograph sensor, temperature sensor, or any other sensor that conductively couples to the user and/or to the external environment through a crown input system, as described herein. In cases where the sensor 1124 is a biometric sensor, it may include biometric sensing circuitry, as well as portions of a crown that conductively couple a user's body to the biometric sensing circuitry. Biometric sensing circuitry may include components such as processors, capacitors, inductors, transistors, analog-to-digital converters, or the like.

The device 1100 may also include a touch sensor 1120 that is configured to determine a location of a touch on a touch-sensitive surface of the device 1100 (e.g., an input surface defined by the portion of a cover 108 over a display 109). The touch sensor 1120 may use or include capacitive sensors, resistive sensors, surface acoustic wave sensors, piezoelectric sensors, strain gauges, or the like. In some cases, the touch sensor 1120 associated with a touch-sensitive surface of the device 1100 may include a capacitive array of electrodes or nodes that operate in accordance with a mutual-capacitance or self-capacitance scheme. The touch sensor 1120 may be integrated with one or more layers of a display stack (e.g., the display 109) to provide the touch-sensing functionality of a touchscreen. Moreover, the touch sensor 1120, or a portion thereof, may be used to sense motion of a user's finger as it slides along a surface of a crown, as described herein.

The device 1100 may also include a force sensor 1122 that is configured to receive and/or detect force inputs applied to a user input surface of the device 1100 (e.g., the display 109). The force sensor 1122 may use or include capacitive sensors, resistive sensors, surface acoustic wave sensors, piezoelectric sensors, strain gauges, or the like. In some cases, the force sensor 1122 may include or be coupled to capacitive sensing elements that facilitate the detection of changes in relative positions of the components of the force sensor (e.g., deflections caused by a force input). The force sensor 1122 may be integrated with one or more layers of a display stack (e.g., the display 109) to provide force-sensing functionality of a touchscreen.

The device 1100 may also include a communication port 1128 that is configured to transmit and/or receive signals or electrical communication from an external or separate device. The communication port 1128 may be configured to couple to an external device via a cable, adaptor, or other type of electrical connector. In some embodiments, the communication port 1128 may be used to couple the device 1100 to an accessory, including a dock or case, a stylus or other input device, smart cover, smart stand, keyboard, or other device configured to send and/or receive electrical signals.

As described above, one aspect of the present technology is the gathering and use of data from a user. The present disclosure contemplates that in some instances this gathered data may include personal information data that uniquely identifies or can be used to contact or locate a specific person. Such personal information data can include demographic data, location-based data, telephone numbers, email addresses, twitter IDs (or other social media aliases or handles), home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide haptic or audiovisual outputs that are tailored to the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act ("HIPAA"); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of determining spatial parameters, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, haptic outputs may be provided based on non-personal information data or a bare minimum amount of personal information, such as events or states at the device associated with a user, other non-personal information, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above and below, or their synonyms, do not necessarily refer to an absolute position relative to an external reference, but instead refer to the relative position of components with reference to the figures.

What is claimed is:

1. An electronic watch comprising:
a housing;
a crown configured to receive a rotational input and comprising:
a knob external to the housing;
a rotor coupled to the knob and configured to rotate in response to the rotational input, the rotor defining a recess extending about a circumference of the rotor; and
a coating positioned in the recess and configured to reflect at least a portion of light incident on the coating; and
an optical sensing system configured to detect the rotational input using the reflected portion of the light.

2. The electronic watch of claim 1, wherein:
the crown further includes a shaft coupling the knob to the rotor;
the coating has a substantially uniform thickness; and
the coating defines an exterior surface that is substantially flush with a circumferential surface of the rotor.

3. The electronic watch of claim 1, wherein the recess has a substantially uniform depth greater than about 50 microns.

4. The electronic watch of claim 1, wherein:
the optical sensing system comprises a laser emitter configured to direct a laser beam onto the coating;
the reflected portion of the light is a reflected portion of the laser beam; and
the optical sensing system determines a speed and a direction of the rotational input using self-mixing laser interferometry.

5. The electronic watch of claim 1, wherein the coating comprises titanium dioxide.

6. The electronic watch of claim 1, wherein:
the coating defines a cylindrical outer surface; and
the coating has a substantially uniform reflectance along its cylindrical outer surface.

7. The electronic watch of claim 1, wherein:
the crown is further configured to receive a translational input; and
the rotor translates from a first position to a second position in response to the translational input.

8. The electronic watch of claim 7, wherein:
the optical sensing system is configured to direct a light beam onto the coating;
in the first position, the light beam directed onto the coating is incident on a first location of the coating; and
in the second position, the light beam directed onto the coating is incident on a second location of the coating.

9. A wearable electronic device comprising:
a housing having a side wall and an opening in the side wall;
a crown configured to receive a rotational input and comprising:
a knob positioned along a side of the housing;
a shaft assembly coupled to the knob and extending through the opening in the side wall; and
a coating positioned in a recess defined along a circumferential surface of the shaft assembly and configured to reflect light; and
an optical sensing system configured to:
receive the light reflected from the coating; and
detect the rotational input using the light reflected from the coating.

10. The wearable electronic device of claim 9, wherein the optical sensing system is further configured to:
direct light onto the coating; and
produce a signal corresponding to a rotational motion of the coating, the signal based at least in part on an interference between the light directed onto the coating and the light reflected from the coating.

11. The wearable electronic device of claim 10, wherein a beam axis of the light directed onto the coating is oblique to the coating.

12. The wearable electronic device of claim 9, wherein the recess has a substantially uniform depth.

13. The wearable electronic device of claim 9, wherein an exterior surface of the coating is substantially flush with the circumferential surface of the shaft assembly.

14. The wearable electronic device of claim 9, wherein:
the crown is further configured to receive a translational input; and
the shaft assembly is configured to actuate a switch in response to the translational input.

15. An electronic watch comprising:
a housing;
a crown configured to receive a rotational input and comprising:
a rotor configured to rotate in response to the rotational input and defining a recess extending about a circumference of the rotor; and
a reflective material positioned in the recess; and
an optical sensing system configured to:
direct light onto the reflective material;
receive a reflected portion of the light, the reflected portion of the light reflected from the reflective material; and
determine a characteristic of the rotational input based on the reflected portion of the light.

16. The electronic watch of claim 15, wherein the recess is defined by:
a first side surface;
a second side surface opposite the first side surface; and
a bottom surface.

17. The electronic watch of claim 16, wherein the first side surface and the second side surface are substantially perpendicular to the bottom surface.

18. The electronic watch of claim 15, wherein the reflective material comprises titanium dioxide and a binder material.

19. The electronic watch of claim 15, wherein:
the light directed onto the reflective material includes a laser beam;
the reflected portion of the light is a reflected portion of the laser beam; and the optical sensing system comprises a laser module configured to emit the laser beam and receive the reflected portion of the laser beam.

20. The electronic watch of claim 19, wherein:

the laser module detects a difference in frequency between the emitted laser beam and the reflected portion of the laser beam; and the characteristic of the rotational input is based at least in part on the difference in the frequency.

* * * * *